(12) United States Patent
Matsubara et al.

(10) Patent No.: US 8,983,696 B2
(45) Date of Patent: Mar. 17, 2015

(54) CONTROL DEVICE FOR A VEHICLE

(75) Inventors: Tooru Matsubara, Toyota (JP); Atsushi Tabata, Okazaki (JP); Yutaka Taga, Aichi-gun (JP); Yasuyuki Ueno, Miyoshi (JP); Hideto Minekawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 101 days.

(21) Appl. No.: 13/818,534

(22) PCT Filed: Aug. 27, 2010

(86) PCT No.: PCT/JP2010/064647
§ 371 (c)(1),
(2), (4) Date: Feb. 22, 2013

(87) PCT Pub. No.: WO2012/026044
PCT Pub. Date: Mar. 1, 2012

(65) Prior Publication Data
US 2013/0151057 A1 Jun. 13, 2013

(51) Int. Cl.
| | |
|---|---|
| *H02K 9/19* | (2006.01) |
| *B60W 20/00* | (2006.01) |
| *B60W 10/02* | (2006.01) |
| *B60W 10/06* | (2006.01) |
| *B60W 10/08* | (2006.01) |
| *B60K 6/445* | (2007.10) |
| *B60K 6/547* | (2007.10) |
| *B60W 10/115* | (2012.01) |
| *H02P 29/00* | (2006.01) |
| *B60K 6/365* | (2007.10) |
| *B60K 1/00* | (2006.01) |
| *F16H 57/04* | (2010.01) |
| *F16H 37/08* | (2006.01) |

(52) U.S. Cl.
CPC *H02K 9/19* (2013.01); *B60K 6/445* (2013.01); *B60K 6/547* (2013.01); *B60K 2001/003* (2013.01); *B60L 2240/425* (2013.01); *B60W 10/115* (2013.01); *B60W 20/00* (2013.01); *B60W 2510/087* (2013.01); *F16H 57/0413* (2013.01); *F16H 2037/0873* (2013.01); *H02P 29/0044* (2013.01); *Y02T 10/6239* (2013.01); *Y02T 10/642* (2013.01); *B60W 10/02* (2013.01); *B60W 10/06* (2013.01); *B60W 10/08* (2013.01); *Y10S 903/93* (2013.01); *B60K 6/365* (2013.01); *F16H 2200/2023* (2013.01)
USPC .................. 701/22; 180/65.265; 903/930

(58) Field of Classification Search
CPC .............. B60K 6/445; B60K 2001/003; B60L 2240/425; B60W 10/115; B60W 20/00; B60W 2510/087; B60W 10/02; B60W 10/06; B60W 10/08; H10S 903/93
USPC .................. 701/22; 180/65.265; 903/930
See application file for complete search history.

(56) References Cited

FOREIGN PATENT DOCUMENTS

| JP | 2003-220856 A | * | 8/2003 | ............. B60K 41/04 |
|---|---|---|---|---|
| JP | A-2003-220856 | | 8/2003 | |
| JP | 2004-028279 A | * | 1/2004 | ............. F16H 61/04 |
| JP | A-2004-028279 | | 1/2004 | |
| JP | 2004-282886 A | * | 7/2004 | ............. B60L 11/14 |
| JP | A-2004-282886 | | 10/2004 | |

* cited by examiner

*Primary Examiner* — Mary Cheung
*Assistant Examiner* — Brian P Sweeney
(74) *Attorney, Agent, or Firm* — Oliff PLC

(57) ABSTRACT

A control device for a vehicle includes an electric motor disposed in a manner enabling power transmission to wheels; and a clutch device capable of interrupting and connecting a power transmission path between the wheels and the electric motor, if temperature of the electric motor exceeds predetermined temperature defined in advance, the electric motor being rotated after the power transmission path between the wheels and the electric motor is interrupted by the clutch device.

16 Claims, 14 Drawing Sheets

|     | C1 | C2 | C3 | B1 | B2  | F1 |
|-----|----|----|----|----|-----|-----|
| 1st | O  |    |    |    | (O) | O  |
| 2nd | O  |    |    | O  |     |    |
| 3rd | O  | O  |    |    |     |    |
| 4th |    | O  |    | O  |     |    |
| R   |    |    | O  |    | O   |    |
| N   |    |    |    |    |     |    |

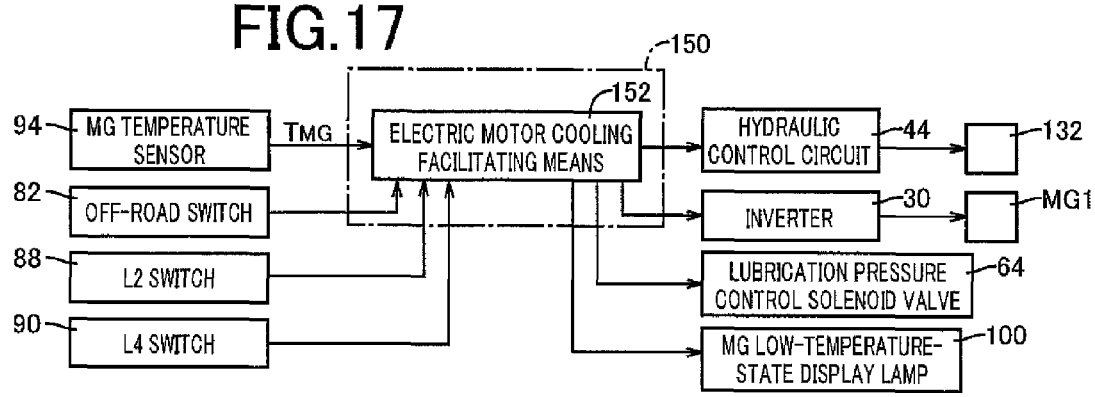
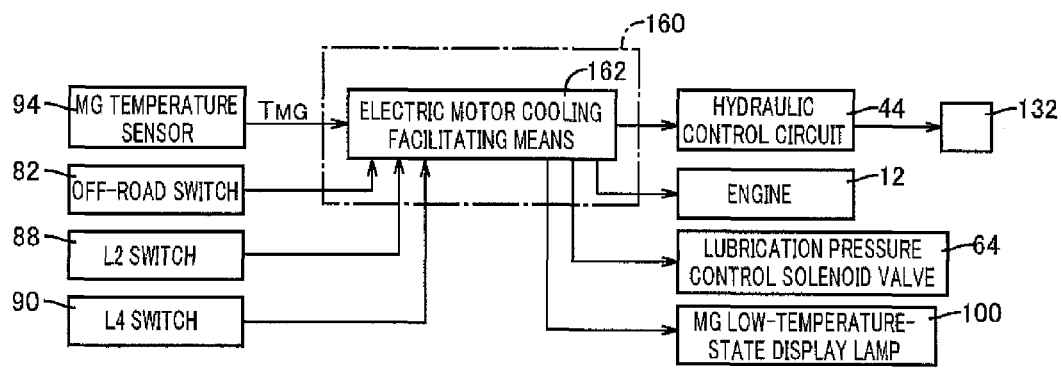

CONTROL DEVICE FOR A VEHICLE

TECHNICAL FIELD

The present invention relates to a control device for a vehicle including an electric motor and a clutch device disposed between the electric motor and wheels and particularly to a technique of facilitating reduction in temperature of the electric motor.

BACKGROUND ART

A control device for a vehicle is known that includes an electric motor in a manner enabling power transmission to wheels and a clutch device capable of interrupting and connecting a power transmission path between the wheels and the electric motor and that interrupts the power transmission path between the wheels and the electric motor with the clutch device if the temperature of the electric motor exceeds a predetermined temperature defined in advance. For example, this corresponds to those described in Patent Documents 1 and 2. Such a control device for a vehicle can suppress increase in temperature of the electric motor.

Patent Document 3 describes a control device for a vehicle that includes an electric motor and an automatic transmission configured to include the clutch device and, if the temperature of the electric motor is high at the time of output of the electric motor while the electric motor and wheels are connected in a power transmittable manner, the control device for a vehicle increases a gear ratio of the automatic transmission to increase rotation of the electric motor while the power transmission path between the electric motor and the wheels is connected by the clutch device. Since a heat generation amount of the electric motor is reduced at the time of high rotation and low output as compared to at the time of low rotation and high output in this device, a heat generation amount of the electric motor can be reduced without limiting the output of the electric motor.

PRIOR ART DOCUMENTS

Patent Documents

Patent Document 1: Japanese Laid-Open Patent Publication No. 2004-282886
Patent Document 2: Japanese Laid-Open Patent Publication No. 2003-220856
Patent Document 3: Japanese Laid-Open Patent Publication No. 2004-028279

SUMMARY OF THE INVENTION

Problems to Be Solved by the Invention

The conventional control devices for a vehicle of Patent Documents 1 and 2 have a problem that time is required until the temperature of the electric motor is sufficiently reduced after the power transmission path between the electric motor and the wheels is interrupted since the electric motor includes an assembly of laminated steel plates and has a large heat capacity and a temperature of the electric motor hardly decreases once the temperature is raised.

The control device for a vehicle of the Patent Document 3 produces effect that a heat generation amount of the electric motor is reduced while the electric motor and the wheels are connected in a power transmittable manner, during output of the electric motor, and during running of a vehicle, and therefore has a problem that the effect is not produced when power transmission between the electric motor and the wheels is interrupted, when a vehicle is stopped, or when output is not executed by the electric motor, for example.

The present invention was conceived in view of the situations and it is therefore an object of the present invention to provide a control device for a vehicle capable of facilitating reduction in temperature of an electric motor.

Means for Solving the Problems

To achieve the object, the first aspect of the present invention provides (a) a control device for a vehicle comprising an electric motor disposed in a manner enabling power transmission to wheels; and a clutch device capable of interrupting and connecting a power transmission path between the wheels and the electric motor, wherein (b) if temperature of the electric motor exceeds predetermined temperature defined in advance, the electric motor is rotated after the power transmission path between the wheels and the electric motor is interrupted by the clutch device.

The second aspect of the present invention provides the control device for a vehicle recited in the first aspect of the present invention, wherein after the power transmission path between the wheels and the electric motor is interrupted by the clutch device, the electric motor is rotated by using an engine disposed as a drive force source of a vehicle.

The third aspect of the present invention provides the control device for a vehicle recited in the first aspect of the present invention, wherein after the power transmission path between the wheels and the electric motor is interrupted by the clutch device, the electric motor is rotated by using another electric motor.

The fourth aspect of the present invention provides the control device for a vehicle recited in the first aspect of the present invention, wherein after the power transmission path between the wheels and the electric motor is interrupted by the clutch device, the electric motor is rotated by supplying a drive current to the electric motor.

The fifth aspect of the present invention provides the control device for a vehicle recited in any one of the first to fourth aspects of the present invention, comprising a cooling device having a lubrication oil supply oil passage supplying lubrication oil from inner circumferential side of the electric motor to the electric motor, the cooling device cooling the electric motor with lubrication oil supplied from the lubrication oil supply oil passage and splashed outward by a centrifugal force generated by rotation of a rotor of the electric motor.

The sixth aspect of the present invention provides the control device for a vehicle recited in any one of the first to fourth aspects of the present invention, comprising a cooling device applying lubrication oil to the electric motor from outside of the electric motor for cooling the electric motor.

The seventh aspect of the present invention provides the control device for a vehicle recited in fifth or sixth aspect of the present invention, wherein when the power transmission path between the wheels and the electric motor is interrupted by the clutch device and the electric motor is rotated, an amount of the lubrication oil supplied from the cooling device to the electric motor is increased as compared to before interruption of the power transmission path.

The eighth aspect of the present invention provides the control device for a vehicle recited in any one of the first to seventh aspects of the present invention, wherein (a) the clutch device is actuated based on an electric command, and wherein (b) if temperature of the electric motor exceeds the predetermined temperature, the power transmission path between the wheels and the electric motor is interrupted by outputting the electric command to actuate the clutch device.

The ninth aspect of the present invention provides the control device for a vehicle recited in any one of the first to eighth aspects of the present invention, wherein (a) the clutch device is actuated in response to clutch switching operation by a driver of the vehicle, wherein (b) the control device for a vehicle comprises a first display device guiding the driver of the vehicle so that a predetermined clutch switching operation is performed for causing the clutch device to interrupt the power transmission path between the wheels and the electric motor if temperature of the electric motor exceeds the predetermined temperature.

The tenth aspect of the present invention provides the control device for a vehicle recited in any one of the first to ninth aspects of the present invention, wherein if the power transmission path between the wheels and the electric motor is interrupted by the clutch device and the electric motor is rotated, rotation speed of the electric motor is made higher when temperature of the electric motor is higher.

The eleventh aspect of the present invention provides the control device for a vehicle recited in any one of the first to tenth aspects of the present invention, wherein when the temperature of the electric motor exceeds the predetermined temperature, if an off-road running mode is established or if a low-speed gear stage for off-road running is established, the electric motor is rotated after the power transmission path between the wheels and the electric motor is interrupted by the clutch device.

The twelfth aspect of the present invention provides the control device for a vehicle recited in any one of the first to eleventh aspects of the present invention, comprising a second display device informing a driver of the vehicle that the temperature of the electric motor is equal to or less than the predetermined temperature.

The Effects of the Invention

According to the control device for a vehicle in the invention recited in the first aspect of the present invention, since if temperature of an electric motor exceeds predetermined temperature, the electric motor is rotated after a power transmission path between wheels and the electric motor is interrupted by a clutch device, lubricant oil supplied for cooling the electric motor is supplied in a larger amount or in a broader area, enhances the cooling effect of the electric motor as compared to the case that the electric motor is not rotated, thereby facilitating the reduction in temperature of the electric motor.

According to the control device for a vehicle in the invention recited in the second aspect of the present invention, since after the power transmission path between the wheels and the electric motor is interrupted by the clutch device, the electric motor is rotated by using an engine disposed as a drive force source of a vehicle, the rotation of the electric motor in an unloaded state suppresses a heat generation amount from the electric motor and, therefore, the reduction in temperature of the electric motor can further be facilitated.

According to the control device for a vehicle in the invention recited in the third aspect of the present invention, since after the power transmission path between the wheels and the electric motor is interrupted by the clutch device, the electric motor is rotated by using another electric motor, the rotation of the electric motor in an unloaded state suppresses a heat generation amount from the electric motor and, therefore, the reduction in temperature of the electric motor can further be facilitated.

According to the control device for a vehicle in the invention recited in the fourth aspect of the present invention, since after the power transmission path between the wheels and the electric motor is interrupted by the clutch device, the electric motor is rotated by supplying a drive current to the electric motor, the lubricant oil supplied for cooling the electric motor is supplied in a larger amount or in a broader area, enhances the cooling effect of the electric motor as compared to the case that the electric motor is not rotated, thereby facilitating the reduction in temperature of the electric motor.

According to the control device for a vehicle in the invention recited in the fifth aspect of the present invention, since a cooling device having a lubrication oil supply oil passage supplying lubrication oil from inner circumferential side of the electric motor to the electric motor, the cooling device cooling the electric motor with lubrication oil supplied from the lubrication oil supply oil passage and splashed outward by a centrifugal force generated by rotation of a rotor of the electric motor is comprised, an amount of the lubrication oil splashed outward from the rotor of the electric motor and supplied to a stator of the electric motor, for example is increased by rotating the electric motor, thereby enhancing the cooling performance of the electric motor.

According to the control device for a vehicle in the invention recited in the sixth aspect of the present invention, since a cooling device applying lubrication oil to the electric motor from outside of the electric motor for cooling the electric motor is comprised, the rotation of the electric motor changes a region to which the lubrication oil is applied in the electric motor, and the lubrication oil is applied to a broader area, thereby enhancing the cooling performance of the electric motor.

According to the control device for a vehicle in the invention recited in the seventh aspect of the present invention, since when the power transmission path between the wheels and the electric motor is interrupted by the clutch device and the electric motor is rotated, an amount of the lubrication oil supplied from the cooling device to the electric motor is increased as compared to before interruption of the power transmission path, the cooling performance of the electric motor is enhanced, thereby facilitating the reduction in temperature of the electric motor.

According to the control device for a vehicle in the invention recited in the eighth aspect of the present invention, since the clutch device is actuated based on an electric command, and wherein if temperature of the electric motor exceeds the predetermined temperature, the power transmission path between the wheels and the electric motor is interrupted by outputting the electric command to actuate the clutch device, the power transmission path between the wheels and the electric motor is interrupted by the actuation of the clutch device without waiting a clutch switching operation by a driver of the vehicle and, therefore, the temperature of the electric motor can quickly be reduced.

According to the control device for a vehicle in the invention recited in the ninth aspect of the present invention, since the clutch device is actuated in response to clutch switching operation by a driver of the vehicle, wherein the control device for a vehicle comprises a first display device guiding the driver of the vehicle so that a predetermined clutch switching operation is performed for causing the clutch device to interrupt the power transmission path between the wheels and the electric motor if temperature of the electric motor exceeds the predetermined temperature, the clutch switching operation of the driver of the vehicle is promptly performed through the guide of the first display device to interrupt the power transmission path between the wheels and the electric motor and, therefore, the temperature of the electric motor can quickly be reduced. Even if a driver of the vehicle is not conscious of rotating the electric motor for enhancing the cooling effect of the lubrication oil on the electric motor, the electric motor can be disconnected from the wheels to put the electric motor into a rotatable state by the clutch switching operation performed through the guide of the first display device.

According to the control device for a vehicle in the invention recited in the tenth aspect of the present invention, since if the power transmission path between the wheels and the electric motor is interrupted by the clutch device and the electric motor is rotated, rotation speed of the electric motor is made higher when temperature of the electric motor is higher, the lubrication oil can be supplied in a larger amount or in a broader area to the electric motor when the temperature of the electric motor is higher and required to be quickly reduced and, therefore, the temperature of the electric motor can quickly be reduced.

According to the control device for a vehicle in the invention recited in the eleventh aspect of the present invention, since when the temperature of the electric motor exceeds the predetermined temperature, if an off-road running mode is established or if a low-speed gear stage for off-road running is established, the electric motor is rotated after the power transmission path between the wheels and the electric motor is interrupted by the clutch device, for example, even if the temperature of the electric motor is increased by continuously running at a low vehicle speed with a high load during running on an off road such as a steep slope and a rocky road, the cooling performance of the electric motor is enhanced by rotating the electric motor, and the temperature of the electric motor can quickly be reduced to resume the off-road running relatively earlier.

According to the control device for a vehicle in the invention recited in the twelfth aspect of the present invention, since a second display device informing a driver of the vehicle that the temperature of the electric motor is equal to or less than the predetermined temperature is comprised, the driver of the vehicle can use the second display device to check whether the vehicle can perform continuous running at an extremely-low vehicle speed during which the temperature of the electric motor relatively tends to rise, for example, the off-road running on a steep slope or a rocky road.

BRIEF DESCRIPTION OF THE DRAWINGS

FIG. 17 is a functional block diagram for explaining a main portion of control function included in an electronic control device of another embodiment of the present invention.

FIG. 18 is a functional block diagram for explaining a main portion of control function included in an electronic control device of another embodiment of the present invention.

BEST MODES FOR CARRYING OUT THE INVENTION

One embodiment of the present invention will now be described in detail with reference to the drawings. The figures are simplified or deformed as needed in the following embodiment and portions are not necessarily precisely depicted in terms of dimension ratio, shape, etc.

First Embodiment

Figure 1:
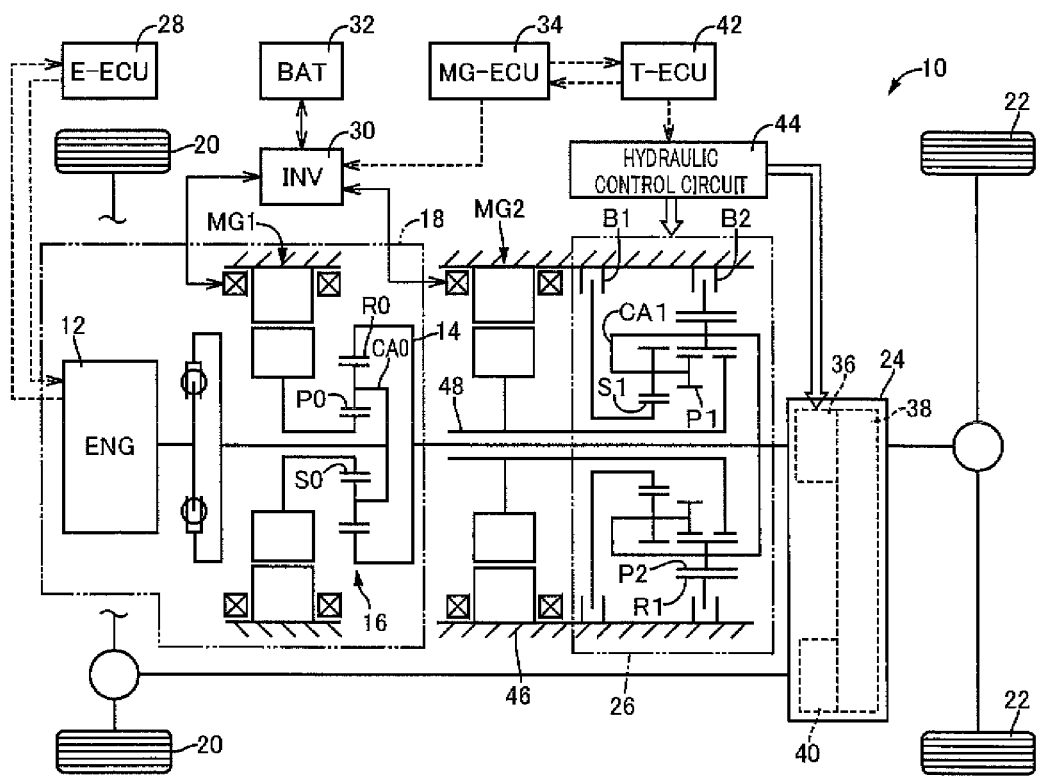
FIG. 1 is a schematic for explaining a configuration of a hybrid vehicle drive device of one embodiment of the present invention.

FIG. 1 is a schematic for explaining a configuration of a hybrid vehicle drive device 10 of one embodiment of the present invention. The hybrid vehicle drive device 10 has an engine 12 as a main drive force source of a vehicle and a differential mechanism 16 distributing power from the engine 12 to a first motor generator MG1 and a transmitting member 14, and includes an electric transmission portion 18 controlling a gear ratio in a stepless manner through control of an operation state of the first motor generator MG1; a power distribution device (transfer) 24 distributing power from the transmitting member 14 to each of front and rear wheels, i.e., front wheels 20 and rear wheels 22; a second motor generator MG2 disposed between the differential mechanism 16 and the power distribution device 24 in a manner enabling power transmission to the transmitting member 14; and an automatic transmission 26 outputting power of the second motor generator MG2 at different speeds. The hybrid vehicle drive device 10 is a multi-type hybrid drive device including the engine 12 as well as two motor generators, i.e., the motor generators MG1 and MG2.

The engine 12 is made up of an internal-combustion engine and has an operation state controlled through control of, for example, an intake air amount, a fuel injection amount, and ignition timing by an engine electronic control device 28.

Each of the first motor generator MG1 and the second motor generator MG2 is made up of for example, an alternating-current synchronous motor generator having a function of an electric motor (motor) and a function of an electric generator (generator). The motor generators MG1 and MG2 are electrically connected via an inverter 30 to a battery (electric storage device) 32 such that respective output torques are adjusted through control of the inverter 30 by an electric-motor electronic control device 34. The first motor generator MG1 corresponds to another electric motor in the present invention and the second motor generator MG2 corresponds to an electric motor in the present invention.

The differential mechanism 16 is made up of a single pinion type planetary gear device including a sun gear S0 coupled to the first motor generator MG1, a ring gear R0 disposed concentrically to the sun gear S0 and coupled to the transmitting member 14, and a carrier CA0 supporting in a rotatable and revolvable manner a pinion gear P0 engaging with each of the sun gear S0 and the ring gear R0.

The power distribution device 24 includes a sub-transmission 36 outputting output from the transmitting member 14 at different speeds, a central differential gear device 38 distributing power from the sub-transmission 36 to the front wheels 20 and the rear wheels 22, and a drive state switching clutch device 40 disposed to be able to connect and interrupt a power transmission path between the central differential gear device 38 and the front wheels 20, connecting the power transmission path between the central differential gear device 38 and the front wheels 20 to put the vehicle into a four-wheel drive state, interrupting the power transmission path between the central differential gear device 38 and the front wheels 20 to put the vehicle into a two-wheel drive state. The sub-transmission 36 can be switched to either a high-speed gear stage for normal running or a low-speed gear stage for off-road running through control of a hydraulic control circuit 44 by a transmission electronic control device 42.

The automatic transmission 26 is made up of a Ravigneaux type planetary gear device including a sun gear S1 coupled via a brake B1 to a transmission case 46, a sun gear S2 coupled to a rotor of the second motor generator MG2, a ring gear R1 disposed concentrically to the sun gears S1 and S2 and coupled via a brake B2 to the transmission case 46, a stepped pinion P1 having a small-diameter portion and a large-diameter portion with the large-diameter portion engaged with the sun gear S1, a pinion P2 engaged with each of the small-diameter portion of the stepped pinion P1 and the sun gear S2 on the inner circumferential side and engaged with the ring gear R1 on the outer circumferential side, and a carrier CA1 supporting each of the stepped pinion P1 and pinion P2 in a rotatable and revolvable manner. The brakes B1 and B2 are hydraulic friction engagement devices including a hydraulic cylinder and a multi-plate type brake frictionally engaged depending on an oil pressure supplied to the hydraulic cylinder.

The automatic transmission 26 has a state in which the brake B1 is engaged, a state in which the brake B2 is engaged, and a state in which both the brakes B1 and B2 are released alternatively switched by actuating the hydraulic control circuit 44 based on an electric command from the transmission electronic control device 42. If the brake B1 is engaged, a first gear stage having a gear ratio greater than "1" is established and, if the brake B2 is engaged, a second gear stage having a gear ratio greater than the first gear stage is established. An assist torque from the second motor generator MG2 is amplified in accordance with a gear ratio and added to the transmitting member 14. If both the brakes B1 and B2 are released, a neutral state, i.e., neutral is established to interrupt the power transmission path between the second motor generator MG2 and the transmitting member 14. The brakes B1 and B2 interrupt and connect the power transmission path between the second motor generator MG2 and the wheels and correspond to a clutch device in the present invention. The brakes B1 and B2 are actuated in response to a clutch switching operation by a driver of the vehicle and is also actuated based on an electric command from the transmission electronic control device 42 even without the clutch switching operation.

Figure 2:
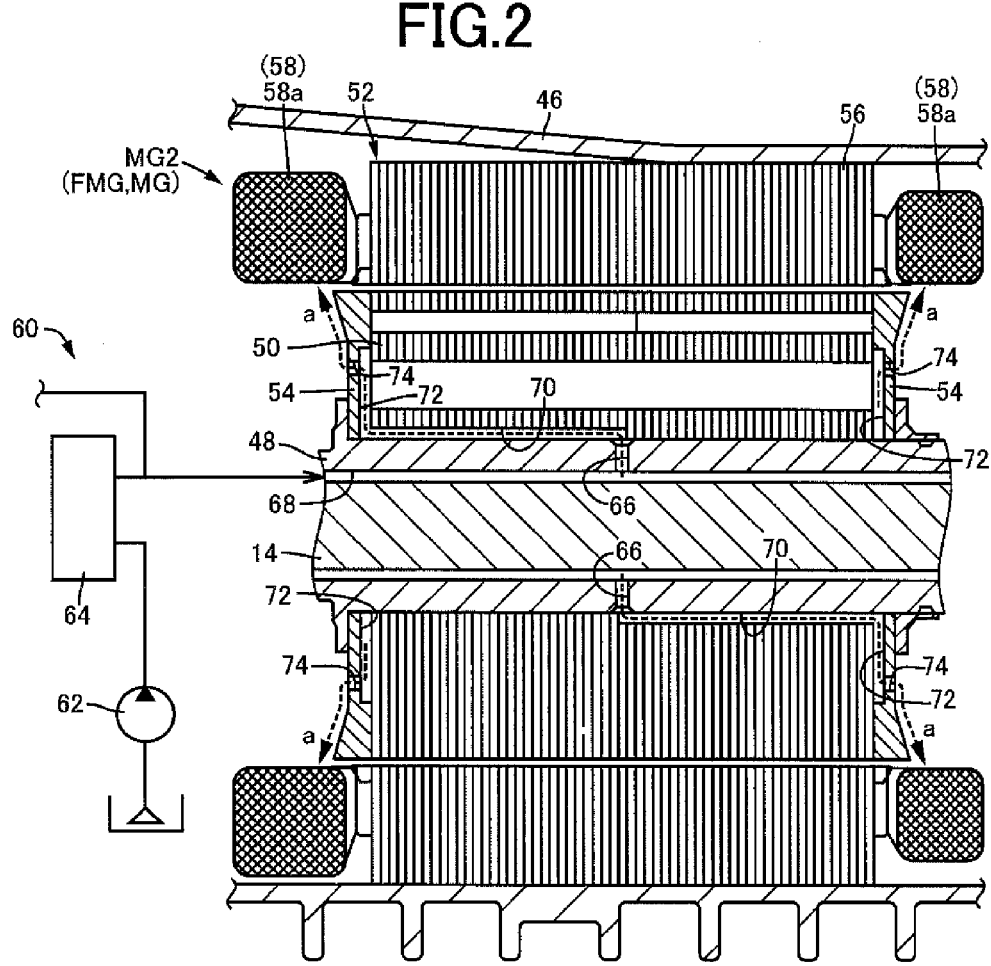
FIG. 2 is a diagram of a cross section including the second motor generator of the hybrid vehicle drive device of FIG. 1.

FIG. 2 is a diagram of a cross section including the second motor generator MG2 of the hybrid vehicle drive device 10. As depicted in FIG. 2, the second motor generator MG2 includes a rotor 50 rotatably supported by a cylindrical rotation shaft 48 disposed on the outer circumferential side of the transmitting member 14 and a stator 52 disposed on the outer circumferential side of the rotor 50 and fixed to the transmission case 46. The rotor 50 is made up of annular steel plates laminated in an axial center direction of the rotation shaft 48 with permanent magnets embedded inside at predetermined intervals in a circumferential direction and is sandwiched from the both sides in the lamination direction and integrally fixed to the rotation shaft 48 by a pair of annular plate-shaped fixing members 54. The stator 52 includes a stator core 56 made up of annular steel plates laminated in the axial center direction as is the case with the rotor 50 and a plurality of coils 58 disposed on the inner circumferential side of the stator core 56 at predetermined intervals in a circumferential direction and is fixed to the transmission case 46 such that a slight gap is formed from the rotor 50. Coil ends 58a depicted in FIG. 2 are portions of the coil 58 axially exposed from the stator 52. The hybrid vehicle drive device 10 includes a cooling device 60 cooling the second motor generator MG2 configured as described above.

The cooling device 60 includes, for example, an electrically-powered oil pump 62, a lubrication pressure control solenoid valve 64 controlling an output oil pressure by using lubrication oil pumped from the oil pump 62 as an original pressure, and a lubrication oil supply oil passage 68 consisting of a cylindrical gap formed between the rotation shaft 48 and the transmitting member 14 to supply the lubrication oil from the lubrication pressure control solenoid valve 64 to the rotor 50 through a through-hole 66 formed to radially penetrate the rotation shaft 48. The cooling device 60 is of a so-called axial center oil cooling type supplying the lubrication oil from the inner circumferential side, i.e., axial center side, of the second motor generator MG2 to cool the second motor generator MG2. The lubrication oil supplied from the through-hole 66 to the rotor 50 axially flows through axial grooves 70 formed in an inner circumferential surface of the rotor 50 to cool the rotor 50. The lubrication oil supplied to radial grooves 72 formed from the axial grooves 70 to the fixing members 54 is discharged from oil discharge holes 74 to the outside of the rotor 50 as indicated by a dotted arrow a in FIG. 2 by rotating the second motor generator MG2 due to a centrifugal force generated by rotation of the rotor 50. The lubrication oil discharged from the oil discharge holes 74 is splashed by the centrifugal force to the outer circumferential side and supplied to the stator 52 to cool the stator 52. In this embodiment, particularly, the lubrication oil discharged from the oil discharge holes 74 is supplied along the side surfaces of the fixing members 54 to the coil ends 58a of the stator 52 to cool the coil ends 58a. A pumping action generated by rotating the second motor generator MG2 as described above increases a lubrication oil amount supplied from the lubrication oil supply oil passage 68 to the rotor 50 as compared to when the pumping action is not generated.

Figure 3:
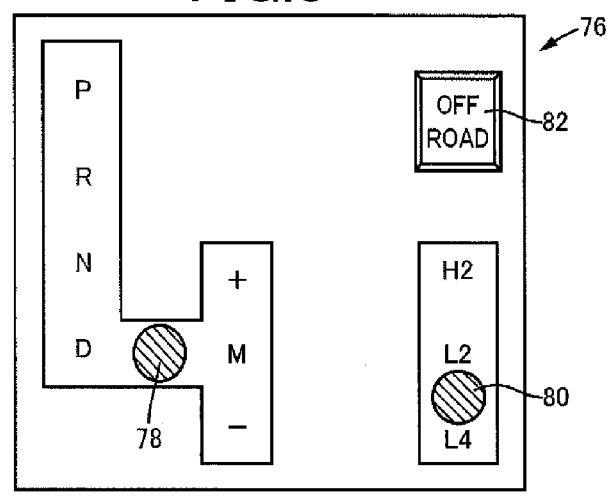
FIG. 3 is a diagram of a shift operation device operated by a driver of the vehicle for switching a shift position of the automatic transmission included in the hybrid vehicle drive device of FIG. 1.

The hybrid vehicle drive device 10 includes a shift operation device 76 for switching a shift position of the automatic transmission 26 by a manual operation of a driver of the vehicle as depicted in FIG. 3. The shift operation device 76 is disposed laterally to a driver seat of the vehicle, for example, and includes a shift lever 78 for selecting any one of a plurality of shift positions. When the shift lever 78 is operated to any one of a plurality of operation positions, any one shift position is selected and set from "P (parking)", "R (reverse)", "N (neutral)", "D (drive)", and "M (manual)". The "N (neutral)" is a neutral position for interrupting the power transmission path between the second motor generator MG2 and the transmitting member 14. The "D (drive)" is a forward automatic transmission position for establishing an automatic transmission mode providing automatic transmission control in which a shift range of the automatic transmission 26 is automatically switched.

The shift operation device 76 also includes a sub-operation lever 80 operated by a driver of the vehicle for switching a shift stage of the sub-transmission 36 of the power distribution device 24 and for switching a drive state of the vehicle by the drive state switching clutch device 40. When the sub-operation lever 80 is operated to any one of a plurality of operation positions, any one of "H2 (high gear, two-wheel drive)", "L2 (low gear, two-wheel drive)", and "L4 (low gear, four-wheel drive)" is selected and set. The "H2" is an operation position for switching the sub-transmission 36 to the high-speed gear stage and for switching a vehicle drive state to the two-wheel drive state by the drive state switching clutch device 40. The "L2" is an operation position for switching the sub-transmission 36 to the low-speed gear stage and for switching a vehicle drive state to the two-wheel drive state by the drive state switching clutch device 40. The "L4" is an operation position for switching the sub-transmission 36 to the low-speed gear stage and for switching a vehicle drive state to the four-wheel drive state by the drive state switching clutch device 40.

The shift operation device 76 also includes an off-road switch 82 for switching to an off-road running mode assisting off-road running (rough-road running) of the vehicle. Each time the push-button type off-road switch 82 is pushed, a normal running mode and the off-road running mode are alternatively switched. In the off-road running mode, for example, since the sub-transmission 36 is switched to the low-speed gear stage and the vehicle is switched to the four-wheel drive state, stable running is facilitated on a rocky road and a steep slope, for example.

The hybrid vehicle drive device 10 as described above switches and actuates the engine running causing the vehicle to run with the power of the engine 12 and the motor running causing the vehicle to run with the power of the second motor generator MG2 depending on a running state of the vehicle. The switching between the engine running and the motor running is performed based on a running state of the vehicle in accordance with a preset map. For example, the control is provided as needed such that output of both the engine 12 and the second motor generator MG2 is used for running the vehicle when the vehicle is suddenly started or rapidly accelerated.

Figure 4:
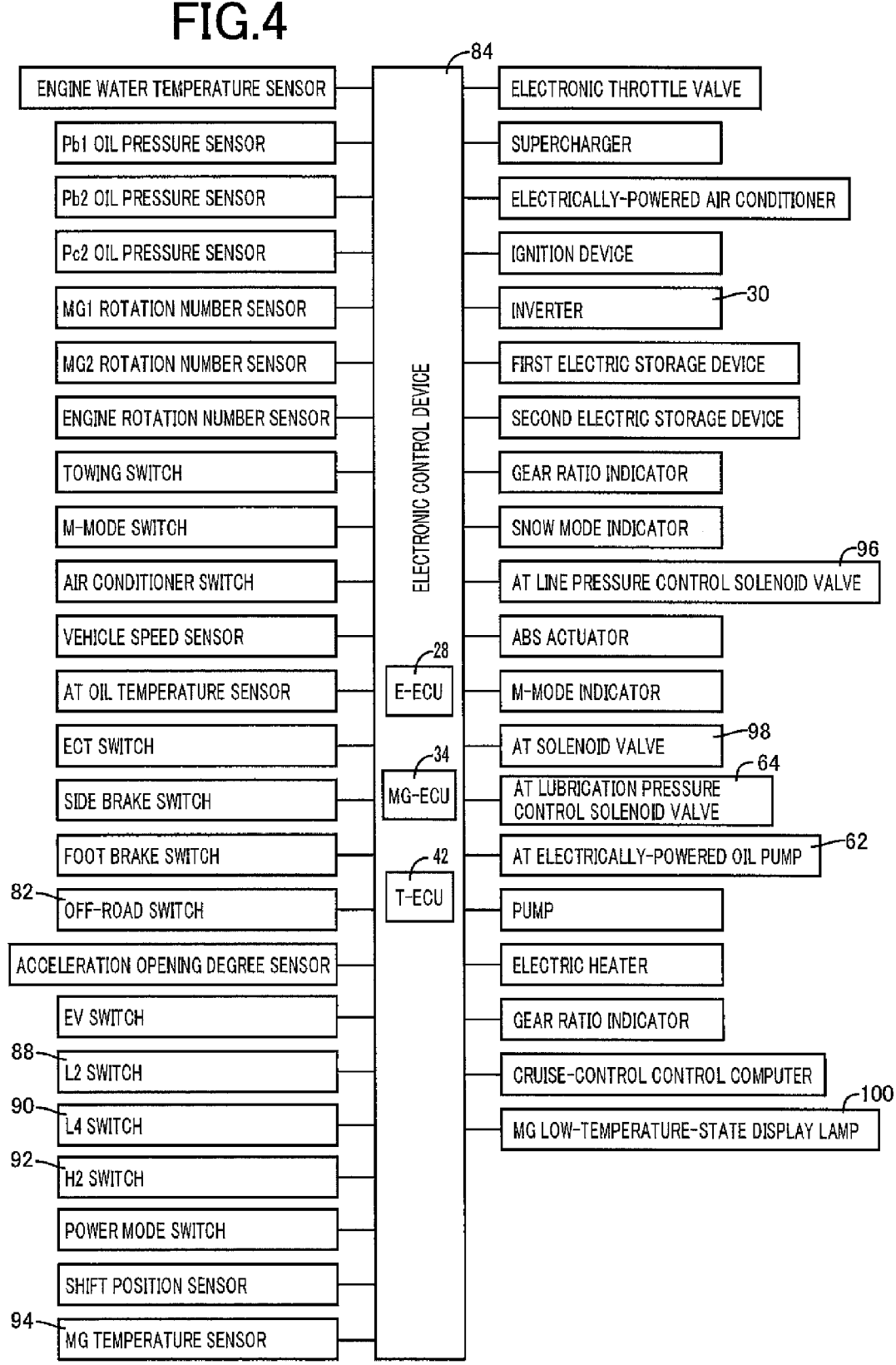
FIG. 4 is a block diagram for explaining a control system for controlling devices disposed on the vehicle.

FIG. 4 is a block diagram for explaining a control system for controlling devices disposed on the vehicle. In FIG. 4, an electronic control device 84 is a device having a function of a control device of the hybrid vehicle drive device 10, includes a so-called microcomputer equipped with a CPU, a RAM, a ROM, and an input/output interface, and has the engine electronic control device 28, the electric-motor electronic control device 34, the transmission electronic control device 42, etc. In the electronic control device 84, the CPU executes signal processes in accordance with programs stored in advance in the ROM, while utilizing a temporary storage function of the RAM, to provide the output control of the engine 12, the output control of the motor generators MG1 and MG2, the shift control of the automatic transmission 26 and the sub-transmission 36, etc.

The electronic control device 84 is supplied with various input signals detected by sensors depicted in FIG. 4 disposed in the vehicle. The input signals include, for example, a signal indicative of an operation state of the off-road switch 82, a signal indicative of an operation position of the sub-operation lever 80 detected by an L2 switch 88, an L4 switch 90, and an H2 switch 92, and a signal indicative of a temperature $T_{MG}$ of the second motor generator MG2 detected by an MG temperature sensor 94.

The electronic control device 84 supplies various output signals to the devices depicted in FIG. 4 disposed on the vehicle. The output signals include, for example, signals supplied to the inverter 30 for the output control of the first motor generator MG1 and the second motor generator MG2, signals supplied to the oil pump 62, an AT line pressure control solenoid valve 96, an AT solenoid valve 98, etc., for the shift control of the automatic transmission 26, signals supplied to the lubrication pressure control solenoid valve 64 for supplying the lubrication oil to the lubrication oil supply oil passage 68 etc., of the cooling device 60 and for controlling a lubrication pressure thereof, and a signal supplied to an MG low-temperature-state display lamp 100 for optically displaying, and informing a driver of the vehicle, that the second motor generator MG2 has a temperature equal to or less than a predetermined temperature temp1 set in advance. The predetermined temperature temp1 is set to around 160 degrees, for example. The MG low-temperature-state display lamp 100 corresponds to a second display device in the present invention.

Figure 5:
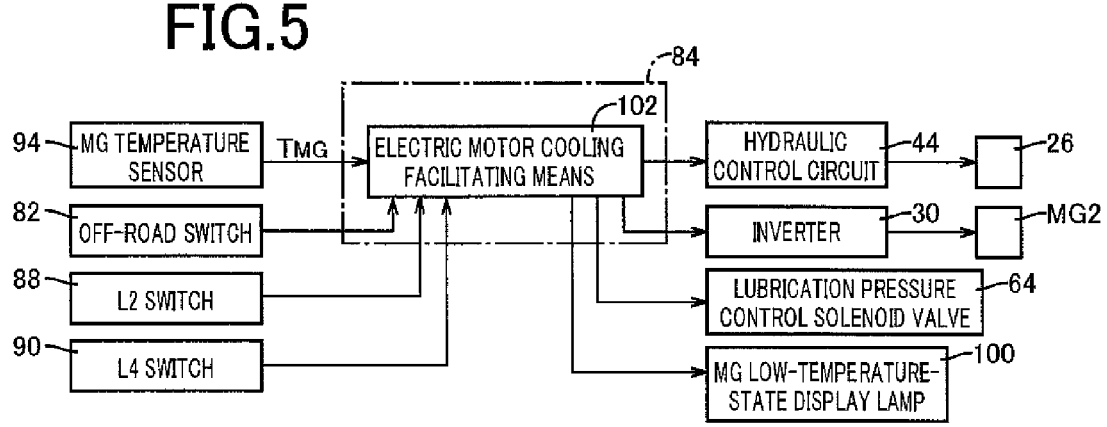
FIG. 5 is a functional block diagram for explaining a main portion of control function included in the electronic control device for controlling the hybrid vehicle drive device of FIG. 1.

FIG. 5 is a functional block diagram for explaining a main portion of control function included in the electronic control device 84. In FIG. 5, when the temperature $T_{MG}$ of the second motor generator MG2 exceeds the predetermined temperature temp1 set in advance, if the off-road running mode is established or if the sub-transmission 36 is switched to the low-speed gear stage for off-road running, an electric motor cooling facilitating means 102 interrupts the power transmission path between the second motor generator MG2 and the wheels with the brakes B1 and B2 (the clutch device) of the automatic transmission 26 and then rotates the second motor generator MG2.

Specifically, the electric motor cooling facilitating means 102 determines whether the off-road switch 82 is turned on, i.e., whether the off-road switch 82 is operated to the operation position for switching to the off-road running mode.

The electric motor cooling facilitating means 102 also determines whether the "L2 (low gear, two-wheel drive)" or "L4 (low gear, four-wheel drive)" is selected by the sub-operation lever 80 to switch the sub-transmission 36 to the low-speed gear stage based on the signals from the L2 switch 88 and the L4 switch 90.

If it is determined that the off-road switch 82 is turned on or that the "L2" or "L4" is selected by the sub-operation lever 80, the electric motor cooling facilitating means 102 determines whether the temperature $T_{MG}$ of the second motor generator MG2 is greater than the predetermined temperature temp1.

If it is determined that the temperature $T_{MG}$ of the second motor generator MG2 is greater than the predetermined temperature temp1, the electric motor cooling facilitating means 102 forcibly actuates the brakes B1 and B2 (the clutch device) of the automatic transmission 26 by outputting an electric command so as to interrupt the power transmission path between the second motor generator MG2 and the front and rear wheels 20 and 22 (wheels). Specifically, the electric motor cooling facilitating means 102 releases both the brakes B1 and B2 to establish the neutral.

Figure 6:
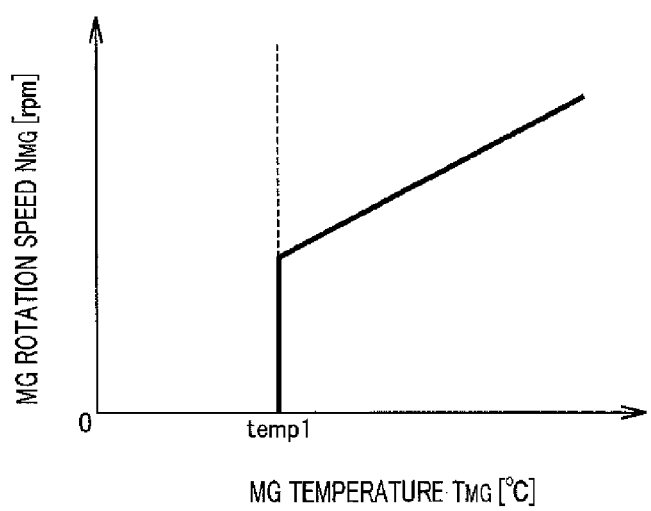
FIG. 6 is a diagram of a relationship between the rotation speed and the temperature of the second motor generator when the second motor generator is rotated by the electric motor cooling facilitating means included in the electronic control device of FIG. 5.

After it is determined that the temperature $T_{MG}$ of the second motor generator MG2 is greater than the predetermined temperature temp1 and the brakes B1 and 132 interrupt the power transmission path between the second motor generator MG2 and the front and rear wheels 20 and 22 (wheels), the electric motor cooling facilitating means 102 rotates the second motor generator MG2. In this case, the second motor generator MG2 is rotated by causing the second motor generator MG2 to function as an electric motor. The electric motor cooling facilitating means 102 makes a rotation speed $N_{MG}$ of the second motor generator MG2 higher when the temperature $T_{MG}$ of the second motor generator MG2 is higher in accordance with a map depicted in FIG. 6 empirically obtained and stored in advance.

When rotating the second motor generator MG2 after it is determined that the temperature $T_{MG}$ is greater than the predetermined temperature temp1 and the brakes B1 and B2 interrupt the power transmission path between the second motor generator MG2 and the front and rear wheels 20 and 22 (wheels), the electric motor cooling facilitating means 102 uses the lubrication pressure control solenoid valve 64 to increase a lubrication oil amount supplied from the cooling device 60 to the second motor generator MG2 (to make a lubrication pressure higher) as compared to immediately before the interruption of the power transmission path.

The electric motor cooling facilitating means 102 lights the MG low-temperature-state display lamp 100 for informing a driver of the vehicle that the temperature $T_{MG}$ is equal to or less than the predetermined temperature temp1 and enables the motor running by the second motor generator MG2 and particularly enables the off-road running during which the temperature $T_{MG}$ of the second motor generator MG2 tends to rise.

Figure 7:
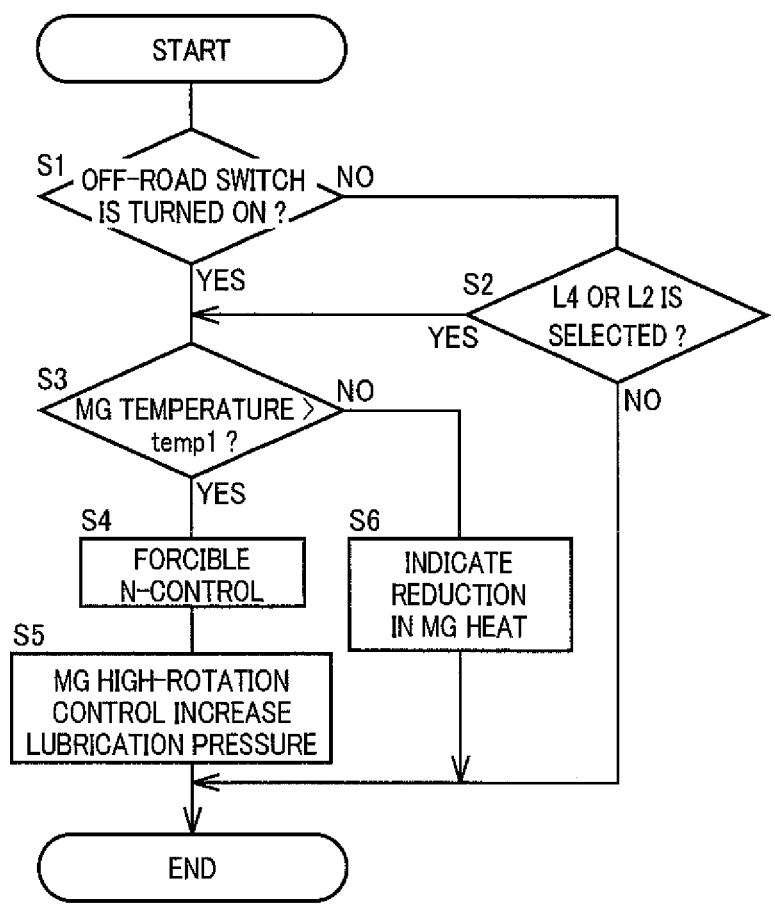
FIG. 7 is a flowchart for explaining a main portion of the control operation performed by the signal processes of the electronic control device of FIG. 5.

FIG. 7 is a flowchart for explaining a main portion of the control operation performed by the signal processes of the electronic control device 84. This flowchart is for the purpose of explaining control operation for the electric motor cooling facilitation control in the control operation by the electronic control device 84 and is repeatedly executed with an extremely short cycle time, for example, on the order of few msec to a few tens of msec. All the steps of this flowchart correspond to the electric motor cooling facilitating means 102.

In FIG. 7, first, at step (hereinafter, "step" will be omitted) S1, it is determined whether the off-road switch 82 is turned on, i.e., whether the off-road switch 82 is operated to the operation position for switching to the off-road running mode.

If the determination at S1 is negative, it is determined at S2 whether the "L2 (low gear, two-wheel drive)" or "L4 (low gear, four-wheel drive)" is selected by the sub-operation lever 80.

If the determination at S2 is negative, this routine is terminated. If the determination at S2 is affirmative and if the determination at S1 is affirmative, it is determined at S3 whether the temperature $T_{MG}$ of the second motor generator MG2 is greater than the predetermined temperature temp1.

If the determination at S3 is affirmative, at S4, an electric command is output to forcibly actuate the brakes B1 and 132 (the clutch device), thereby interrupting the power transmission path between the second motor generator MG2 and the front and rear wheels 20 and 22 (wheels). In other words, both the brakes B1 and B2 are released to establish the neutral.

Following S4, at S5, the second motor generator MG2 is rotated after the automatic transmission 26 is put into the neutral. In this case, the rotation speed $N_{MG}$ of the second motor generator MG2 is made higher when the temperature $T_{MG}$ of the second motor generator MG2 is higher in accordance with the map depicted in FIG. 6 empirically obtained and stored in advance. At S5, the lubrication pressure control solenoid valve 64 is used for increasing a lubrication oil amount supplied from the cooling device 60 to the second motor generator MG2 (for making a lubrication pressure higher) as compared to immediately before the automatic transmission 26 is put into the neutral. This routine is then terminated.

If the determination at S3 is negative, the MG low-temperature-state display lamp 100 is lighted for informing a driver of the vehicle that the temperature $T_{MG}$ is equal to or less than the predetermined temperature temp1 and enables the motor running by the second motor generator MG2 and particularly enables the off-road running during which the temperature $T_{MG}$ of the second motor generator MG2 tends to rise. This routine is then terminated.

According to the electronic control device 84 as the control device for a vehicle of this embodiment, since the electric motor cooling facilitating means 102 is included and when the temperature $T_{MG}$ of the second motor generator MG2 exceeds the predetermined temperature temp1 set in advance, if the off-road running mode is established or if the sub-transmission 36 is switched to the low-speed gear stage for off-road running, the electric motor cooling facilitating means 102 rotates the second motor generator MG2 after the power transmission path between the second motor generator MG2 and the wheels is interrupted by the brakes B1 and B2 (the clutch device) of the automatic transmission 26, the lubricant oil supplied from the cooling device 60 for cooling the second motor generator MG2 is supplied in a broader area, enhances the cooling effect of the second motor generator, and raises a saturation range of cooling performance as compared to the case that the second motor generator MG2 is not rotated, thereby facilitating the reduction in temperature of the second motor generator MG2. For example, even if the temperature of the second motor generator MG2 is increased by continuously running at a low vehicle speed with a high load during running on an off road such as a steep slope and a rocky road, the temperature $T_{MG}$ of the second motor generator MG2 can quickly be reduced to resume the off-road running relatively earlier.

According to the electronic control device 84 of this embodiment, after the power transmission path between the second motor generator MG2 and the wheels is interrupted by the brakes B1 and B2 (the clutch device) of the automatic transmission 26, a drive current is supplied to the second motor generator MG2 to rotate the second motor generator MG2 and, therefore, the reduction in temperature of the second motor generator MG2 can be facilitated.

According to the electronic control device 84 of this embodiment, since the cooling device 60 is included that has the lubrication oil supply oil passage 68 supplying the lubrication oil from the lubrication pressure control solenoid valve 64 to the rotor 50 from the inner circumferential side of the second motor generator MG2 to cool the rotor 50 with the lubrication oil supplied from the lubrication oil supply oil passage 68 flowing through the axial grooves 70 in an axial direction and to cool the stator 52 with the lubrication oil supplied from the axial grooves 70 to the radial grooves 72 and splashed outward from the oil discharge holes 74 by a centrifugal force generated by rotation of the rotor 50, an amount of the lubrication oil splashed outward from the rotor 50 and supplied to the stator 52 is increased by rotating the rotor 50 of the second motor generator MG2, thereby enhancing the cooling performance of the second motor generator MG2, particularly, the cooling performance of the stator 52.

According to the electronic control device 84 of this embodiment, after it is determined that the temperature $T_{MG}$ of the second motor generator MG2 is greater than the predetermined temperature temp1 and the brakes B1 and B2 interrupt the power transmission path between the second motor generator MG2 and the front and rear wheels 20 and 22 (wheels), when the second motor generator MG2 is rotated, the electric motor cooling facilitating means 102 makes the rotation speed $N_{MG}$ of the second motor generator MG2 higher when the temperature $T_{MG}$ of the second motor generator MG2 is higher and, therefore, the lubrication oil can be supplied in a larger amount or in a broader area to the second motor generator MG2 when the temperature of the second motor generator MG2 is higher and required to be quickly reduced.

According to the electronic control device 84 of this embodiment, after it is determined that the temperature $T_{MG}$ of the second motor generator MG2 is greater than the predetermined temperature temp1 and the brakes B1 and B2 interrupt the power transmission path between the second motor generator MG2 and the front and rear wheels 20 and 22 (wheels), when the second motor generator MG2 is rotated, the electric motor cooling facilitating means 102 uses the lubrication pressure control solenoid valve 64 to increase a lubrication oil amount supplied from the cooling device 60 to the second motor generator MG2 as compared to immediately before the interruption of the power transmission path and, therefore, the cooling performance of the second motor generator MG2 is enhanced, thereby facilitating the reduction in temperature of the second motor generator MG2.

According to the electronic control device 84 of this embodiment, since the brakes B1 and B2 (the clutch device) are actuated based on an electric command and, if it is determined that the temperature $T_{MG}$ of the second motor generator MG2 is greater than the predetermined temperature temp1, the electric motor cooling facilitating means 102 outputs the electric command and forcibly actuates the brakes B1 and B2 to interrupt the power transmission path between the second motor generator MG2 and the front and rear wheels 20 and 22 (wheels), the power transmission path between the second motor generator MG2 and the front and rear wheels 20 and 22 (wheels) is interrupted without waiting a clutch switching operation by a driver of the vehicle and, therefore, the temperature of the second motor generator MG2 can quickly be reduced.

According to the electronic control device 84 of this embodiment, since the MG low-temperature-state display lamp (second display device) 100 is included that informs a driver of the vehicle that the temperature $T_{MG}$ of the second motor generator MG2 is equal to or less than the predetermined temperature temp1 and enables the motor running by the second motor generator MG2 and particularly enables the off-road running during which the temperature $T_{MG}$ of the second motor generator MG2 tends to rise, the driver of the vehicle can use the MG low-temperature-state display lamp 100 to check whether the vehicle can perform continuous running at an extremely-low vehicle speed during which the temperature of the second motor generator MG2 relatively tends to rise, for example, the off-road running on a steep slope or a rocky road.

Second Embodiment

Other embodiments of the present invention will be described. In the description of the following embodiments, the mutually overlapping portions of the embodiments are denoted by the same reference numerals and will not be described.

Figure 8:
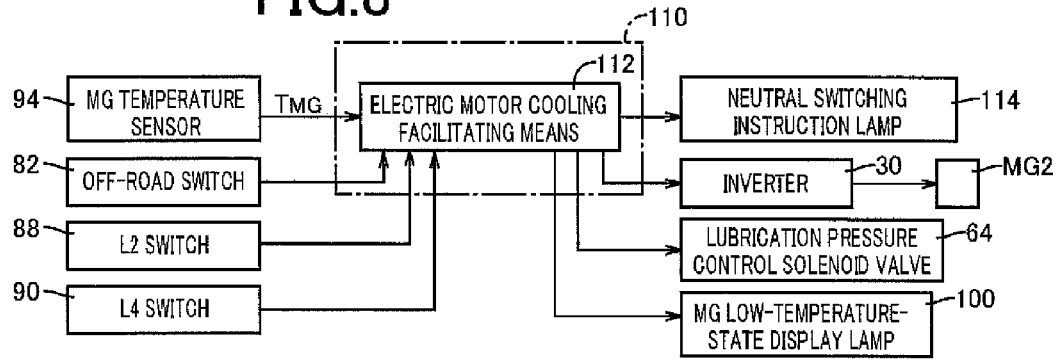
FIG. 8 is a functional block diagram for explaining a main portion of control function included in an electronic control device of another embodiment of the present invention.

FIG. 8 is a functional block diagram for explaining a main portion of control function included in an electronic control device 110 of another embodiment of the present invention. The electronic control device 110 controls the hybrid vehicle drive device 10 of FIG. 1. In FIG. 8, an electric motor cooling facilitating means 112 is different from the electric motor cooling facilitating means 102 of the first embodiment in the following point. When the off-road running mode is established or when the sub-transmission 36 is switched to the low-speed gear stage for off-road running, if the temperature $T_{MG}$ of the second motor generator MG2 exceeds the predetermined temperature temp1 set in advance, the electric motor cooling facilitating means 112 lights a neutral switching instruction lamp (first display device) 114 so as to guide a driver of the vehicle so that a predetermined clutch switching operation is performed for releasing both the brakes B1 and B2 to establish the neutral. The neutral switching instruction lamp 114 is a lamp guiding a driver of the vehicle so that the predetermined clutch switching operation is performed. After the neutral is established by the brakes B1 and B2 and the power transmission path between the second motor generator MG2 and the wheels is interrupted, the electric motor cooling facilitating means 112 rotates the second motor generator MG2. The electric motor cooling facilitating means 112 has the same configuration as the electric motor cooling facilitating means 102 of the first embodiment except the description.

Figure 9:
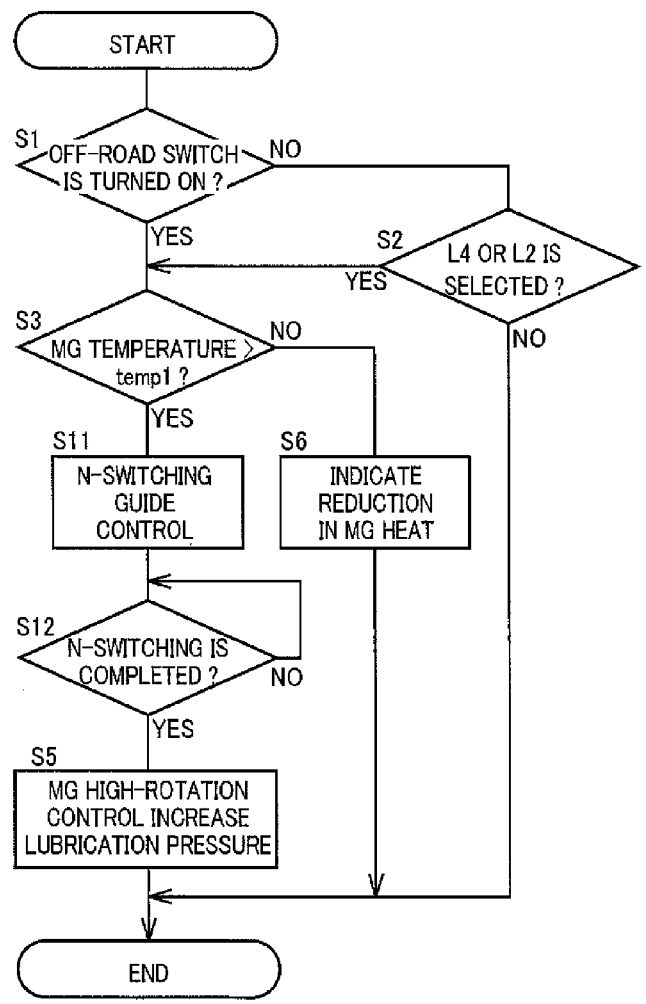
FIG. 9 is a flowchart for explaining a portion of the control operation performed by the signal processes of the electronic control device of FIG. 5.

FIG. 9 is a flowchart for explaining a portion of the control operation performed by the signal processes of the electronic control device 110 and is repeatedly executed with an extremely short cycle time, for example, on the order of few msec to a few tens of msec. All the steps of this flowchart correspond to the electric motor cooling facilitating means 112. The control operation of the electronic control device 110 is the same as the control operation of the electronic control device 84 of the first embodiment except that S11 and S12 of FIG. 9 are executed instead of S4 of the flowchart of FIG. 7.

In FIG. 9, if the determination at S3 is affirmative, at S11, the neutral switching instruction lamp (first display device) 114 is lighted so as to guide a driver of the vehicle so that a predetermined clutch operation is performed for releasing both the brakes B1 and B2 to establish the neutral.

Following S11, it is determined at S12 whether the switching to the neutral with both the brakes B1 and B2 released is completed.

If the determination at S12 is negative, S12 and later are repeatedly executed. If the determination at S12 is affirmative, the neutral switching instruction lamp 114 is turned off and S5 is executed.

According to the electronic control device 110 as the control device for a vehicle of this embodiment, since the electric motor cooling facilitating means 112 is included and when the temperature $T_{MG}$ of the second motor generator MG2 exceeds the predetermined temperature temp1 set in advance, if the off-road running mode is established or if the sub-transmission 36 is switched to the low-speed gear stage for off-road running, the electric motor cooling facilitating means 112 rotates the second motor generator MG2 after the power transmission path between the second motor generator MG2 and the wheels is interrupted by the brakes B1 and B2 (the clutch device), the lubricant oil supplied from the cooling device 60 for cooling the second motor generator MG2 is supplied in a broader area, enhances the cooling effect of the second motor generator MG2 as compared to the case that the second motor generator MG2 is not rotated, thereby facilitating the reduction in temperature of the second motor generator MG2 as is the case with the first embodiment.

According to the electronic control device 110 of this embodiment, since the brakes B1 and B2 (clutch device) are actuated in response to a clutch switching operation by a driver of the vehicle and the neutral switching instruction lamp (first display device) 114 is included that is lighted so as to guide a driver of the vehicle so that a predetermined clutch switching operation is performed for interrupting the power transmission path between the second motor generator MG2 and the wheels with the brakes B1 and B2 if the temperature $T_{MG}$ of the second motor generator MG2 exceeds the predetermined temperature temp1, the clutch switching operation of the driver of the vehicle is promptly performed through the guide of the neutral switching instruction lamp to interrupt the power transmission path between the second motor generator MG2 and the wheels and, therefore, the temperature of the second motor generator MG2 can quickly be reduced. Even if a driver of the vehicle is not conscious of rotating the second motor generator MG2 for enhancing the cooling effect of the lubrication oil on the second motor generator MG2, the second motor generator MG2 can be disconnected from the wheels to put the second motor generator MG2 into a rotatable state by the clutch switching operation performed through the guide of the neutral switching instruction lamp 114.

Third Embodiment

Figure 10:
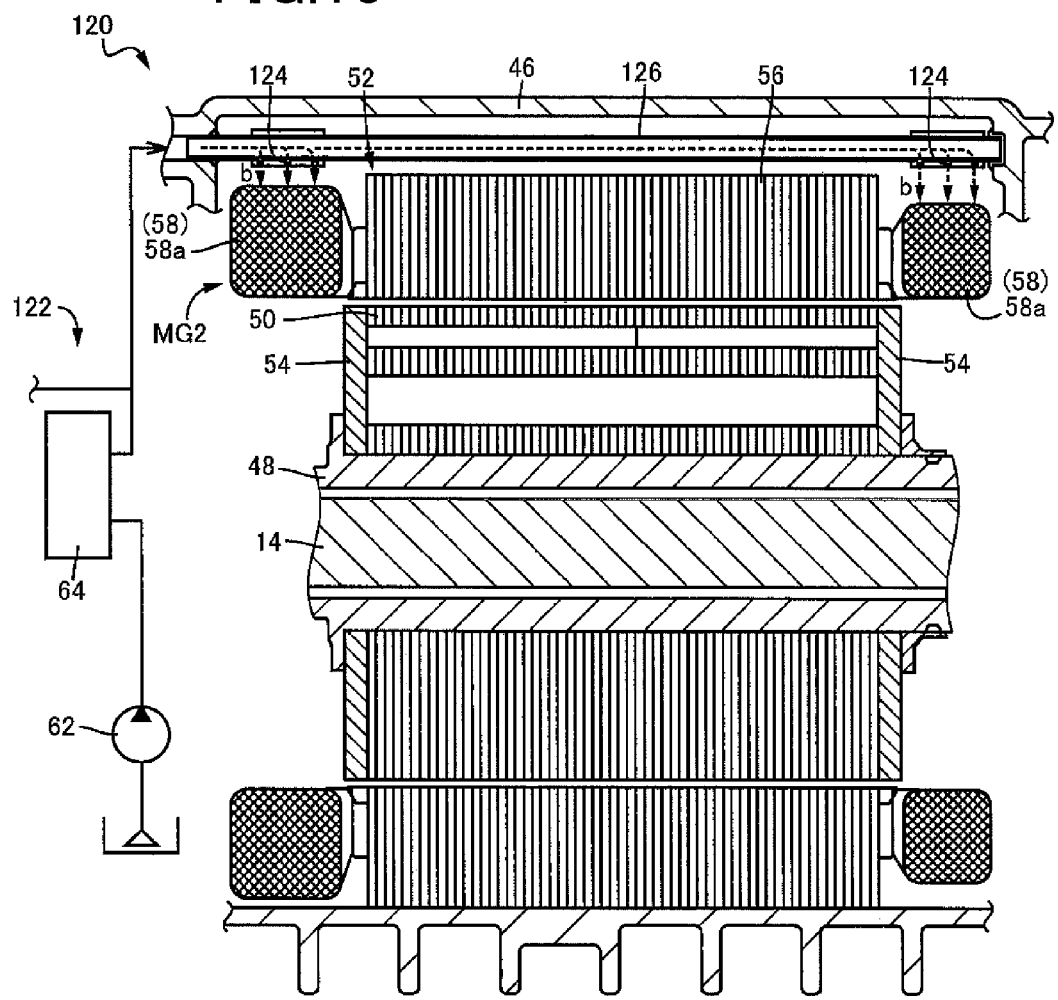
FIG. 10 is a diagram of a cooling device included in a hybrid vehicle drive device of another embodiment of the present invention.

FIG. 10 is a diagram of a cooling device 122 included in a hybrid vehicle drive device 120 of another embodiment of the present invention. The hybrid vehicle drive device 120 is different from the hybrid vehicle drive device 10 of FIG. 1 in that the cooling device 122 is disposed instead of the cooling device 60. As depicted in FIG. 10, the cooling device 122 includes the electrically-powered oil pump 62, the lubrication pressure control solenoid valve 64 controlling an output oil pressure by using lubrication oil pumped from the oil pump 62 as an original pressure, and a lubrication oil supply tube 126 that consists of a tube-shaped member formed longitudinally in the axial center direction and fixedly disposed on the transmission case 46 on the outer circumferential side of the stator 52 of the second motor generator MG2 and that supplies the lubrication oil from the lubrication pressure control solenoid valve 64 to the second motor generator MG2 through lubrication oil discharge holes 124 formed in a penetrating manner toward the second motor generator MG2. The cooling device 122 is of a so-called sprinkle oil cooling type sprinkling the lubrication oil in accordance with pressure or gravity from the outside of the second motor generator MG2 for cooling the second motor generator MG2. The lubrication oil supplied from the lubrication pressure control solenoid valve 64 to the lubrication oil supply tube 126 is sprinkled from the lubrication oil discharge holes 124 to the coil ends 58a of the stator 52 as indicated by a dotted arrow b in FIG. 10 to cool the stator 52. The lubrication oil sprinkled to the stator 52 is supplied along the stator 52 to the rotor 50 to cool the rotor 50. In this case, the rotation of the rotor 50 changes a region or a flow passage to which the lubrication oil is applied in the rotor 50 and the lubrication oil is applied to a broader area.

The hybrid vehicle drive device 120 is controlled by the electronic control device 84 of FIG. 5 as is the case with the first embodiment.

According to the electronic control device 84 as the control device for a vehicle of this embodiment, since the electric motor cooling facilitating means 102 is included as is the case with the first embodiment, the lubricant oil supplied from the cooling device 122 for cooling the second motor generator MG2 is supplied in a broader area, enhances the cooling effect of the second motor generator MG2, thereby facilitating the reduction in temperature of the second motor generator MG2.

According to the electronic control device 84 of this embodiment, since the so-called sprinkle oil cooling type cooling device 122 is included that sprinkles the lubrication oil from the outside of the second motor generator MG2 for cooling the second motor generator MG2, the rotation of the second motor generator MG2 changes a region to which the lubrication oil is applied in the rotor 50 of the second motor generator MG2, and the lubrication oil is applied to a broader area, thereby enhancing the cooling performance of the second motor generator MG2.

Fourth Embodiment

Figures 11, 12:
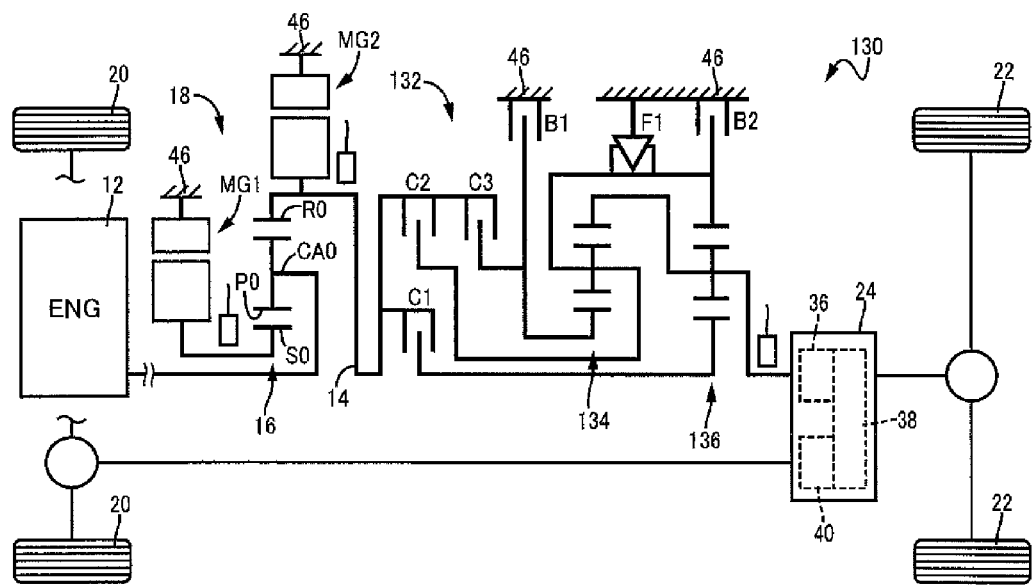
FIG. 11 is a schematic for explaining a configuration of a hybrid vehicle drive device of another embodiment of the present invention.
FIG. 12 is a diagram of an operation table of the hydraulic friction engagement devices of the automatic transmission included in the hybrid vehicle drive device of FIG. 11.

FIG. 11 is a schematic for explaining a configuration of a hybrid vehicle drive device 130 of another embodiment of the present invention. The hybrid vehicle drive device 130 has the engine 12 as a main drive force source of a vehicle and the differential mechanism 16 distributing power from the engine 12 to the first motor generator MG1 and the transmitting member 14, and includes the electric transmission portion 18 controlling a gear ratio in a stepless manner through control of an operation state of the first motor generator MG1; an automatic transmission 132 outputting power from the transmitting member 14 at different speeds; the power distribution device (transfer) 24 distributing power from the automatic transmission 132 to each of front and rear wheels, i.e., the front wheels 20 and the rear wheels 22; and the second motor generator MG2 disposed between the differential mechanism 16 and the automatic transmission 132 in a manner enabling power transmission to the transmitting member 14. The hybrid vehicle drive device 130 includes the cooling device 60 of FIG. 2 cooling the second motor generator MG2 as is the case with the hybrid vehicle drive device 10 of the first embodiment. The first motor generator MG1 corresponds to another electric motor in the present invention and the second motor generator MG2 corresponds to an electric motor in the present invention.

As depicted in FIG. 11, the automatic transmission 132 includes a first planetary gear device 134, a second planetary gear device 136, a plurality of hydraulic friction engagement devices (clutches C1 to C3 and brakes B1 and B2), and a unidirectional clutch F1. In the automatic transmission 132, each of the hydraulic friction engagement devices is engaged or released in accordance with a predetermined operation table depicted in FIG. 12 to establish any one of gear stages of four forward speeds having respective different gear ratios and one reverse speed and the neutral at which the power transmission path between the engine 12 or the second motor generator MG2 and the transmitting member 14 is interrupted. In FIG. 12, "∘" indicates an engaged state and a blank indicates a released state respectively. The hydraulic friction engagement devices (clutches C1 to C3 and brakes B1 and B2) are those interrupting and connecting the power transmission path between the second motor generator MG2 and the wheels and correspond to the clutch device in the present invention. The hydraulic friction engagement devices are actuated in response to a clutch switching operation by a driver of the vehicle and are also actuated based on an electric command from an electronic control device 138 of FIG. 15 even without the clutch switching operation.

Figure 13:
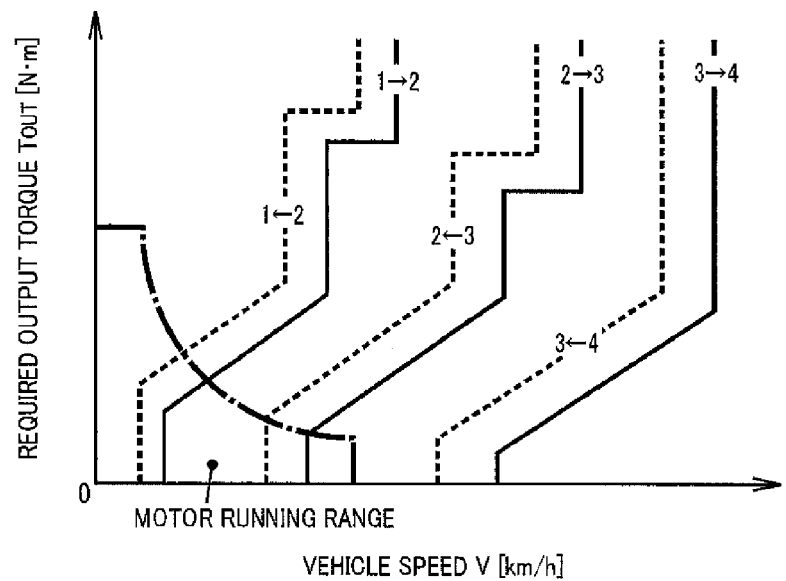
FIG. 13 is a diagram of a shift diagram used in the automatic transmission control of the automatic transmission of FIG. 11.

The automatic transmission control of the automatic transmission 132 is provided in accordance with a preliminarily stored shift diagram made up of a plurality of shift lines set within two-dimensional coordinates of a vehicle speed axis and a required output torque axis as depicted in FIG. 13. Specifically, a gear stage to be achieved in the automatic transmission 132 is determined based on a vehicle speed V [km/h] and a required output torque $T_{OUT}$ [N·m] from the shift diagram depicted in FIG. 13 and the hydraulic friction engagement devices are actuated in accordance with the operation table depicted in FIG. 12 such that the determined gear stage is established.

Figure 14:
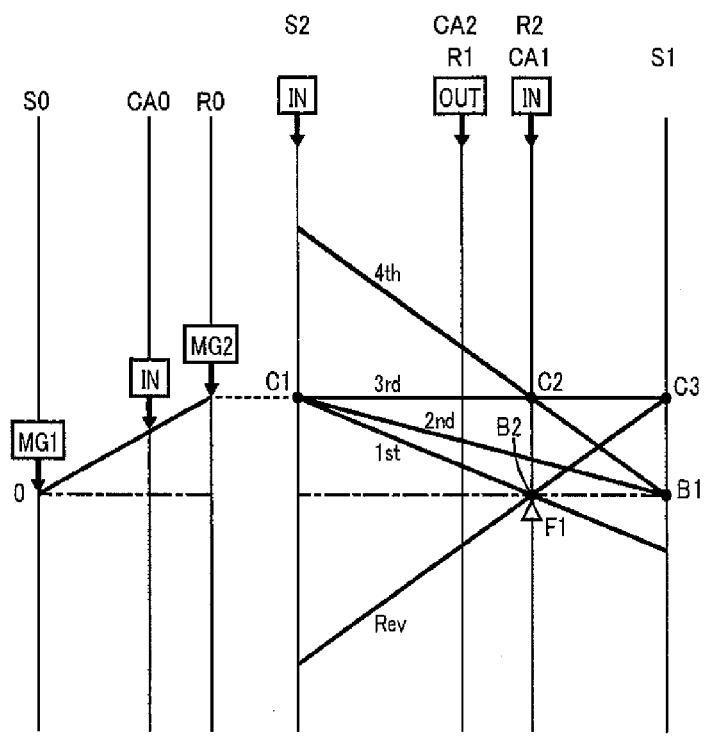
FIG. 14 is a collinear diagram of relative relationships of rotation speeds of rotating elements in the differential mechanism of the electric transmission portion included in the hybrid vehicle drive device of FIG. 11.

A collinear diagram of FIG. 14 depicts relative relationships of rotation speeds of rotating elements in the differential mechanism 16 of the electric transmission portion 18. In the collinear diagram of FIG. 14, a vertical axis S, a vertical axis CA, and a vertical axis R are axes indicative of a rotation speed of the sun gear S0, a rotation speed of a carrier CA0, and a rotation speed of a ring gear R0, respectively, and mutual intervals of the vertical axis S, the vertical axis CA, and the vertical axis R are set such that when an interval between the vertical axis S and the vertical axis CA is defined as one, an interval between the vertical axis CA and the vertical axis R is set to a predetermined value ρ (teeth number of the sun gear S0/teeth number of the ring gear R0). In the electric transmission portion 18, the rotation speed of the first motor generator MG1 is changed to a higher or lower level when the rotation speed of the transmitting member 14 is constant, thereby continuously varying the rotation speed of the engine 12. Therefore, the electric transmission portion 18 is caused to operate as an electric continuously variable transmission having a ratio between an output rotation speed (rotation speed of the transmitting member 14) and an input rotation speed (rotation speed of the engine 12), i.e., a gear ratio, varied in a stepless manner through the control of the rotation speed of the first motor generator MG1.

The hybrid vehicle drive device 130 configured as described above switches and actuates the engine running causing the vehicle to run with the power of the engine 12 and the motor running causing the vehicle to run with the power of the second motor generator MG2 depending on a running state of the vehicle. The switching between the engine running and the motor running is performed based on which of an engine running range and a motor running range sectionalized by a dashed-dotted line in FIG. 13 a running state of the vehicle belongs to.

Figure 15:
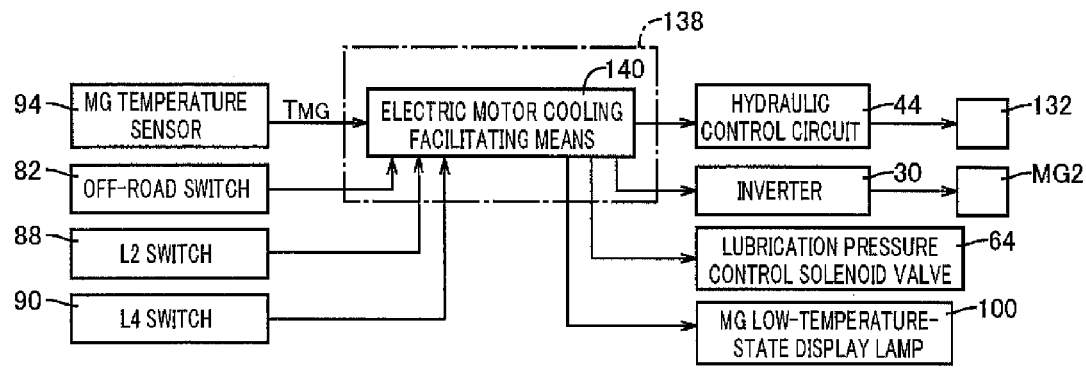
FIG. 15 is a functional block diagram for explaining a main portion of control function included in the electronic control device for controlling the hybrid vehicle drive device of FIG. 11.
Figure 16:
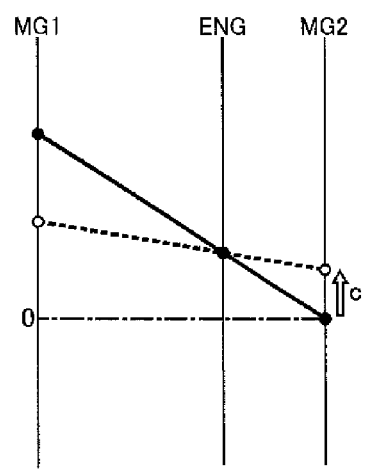
FIG. 16 is a collinear diagram of a situation where the second motor generator is rotated by causing the second motor generator to function as an electric motor through the electric motor cooling facilitating means included in the electronic control device of FIG. 15.

FIG. 15 is a functional block diagram for explaining a main portion of control function included in the electronic control device 138 of this embodiment. The electronic control device 138 controls the hybrid vehicle drive device 130 of FIG. 11 and corresponds to a control device for a vehicle in the present invention. In FIG. 15, an electric motor cooling facilitating means 140 is different from the electric motor cooling facilitating means 102 of the first embodiment in the following point. The electric motor cooling facilitating means 138 releases all the hydraulic friction engagement devices (clutches C1 to C3 and brakes B1 and B2) of the automatic transmission 132 to interrupt the power transmission path between the second motor generator MG2 and the front and rear wheels 20 and 22 (wheels). Therefore, when the temperature $T_{MG}$ of the second motor generator MG2 exceeds the predetermined temperature temp1 set in advance, if the off-road running mode is established or if the sub-transmission 36 is switched to the low-speed gear stage for off-road running, after all the hydraulic friction engagement devices (clutches C1 to C3 and brakes B1 and B2) of the automatic transmission 132 are released to interrupt the power transmission path between the second motor generator MG2 and the wheels, the rotation speed $N_{MG}$ of the second motor generator MG2 is increased as indicated by an arrow c in the collinear diagram of FIG. 16. In this case, the second motor generator MG2 is rotated by causing the second motor generator MG2 to function as an electric motor.

In this embodiment, well-known hill hold brake control is provided for preventing a vehicle from going backward on, for example, a slope road, immediately after the power transmission path between the second motor generator MG2 and the wheels is interrupted as described above.

According to the electronic control device 138 as the control device for a vehicle of this embodiment, since the electric motor cooling facilitating means 140 is included and when the temperature $T_{MG}$ of the second motor generator MG2 exceeds the predetermined temperature temp1 set in advance, if the off-road running mode is established or if the sub-transmission 36 is switched to the low-speed gear stage for off-road running, the electric motor cooling facilitating means 140 rotates the second motor generator MG2 after all the hydraulic friction engagement devices (clutches C1 to C3 and brakes B1 and B2) of the automatic transmission 132 are released to interrupt the power transmission path between the second motor generator MG2 and the wheels, the lubricant oil supplied from the cooling device 60 for cooling the second motor generator MG2 is supplied in a broader area, enhances the cooling effect of the second motor generator MG2 as compared to the case that the second motor generator MG2 is not rotated, thereby facilitating the reduction in temperature of the second motor generator MG2 as is the case with the first embodiment.

Fifth Embodiment

FIG. 17 is a functional block diagram for explaining a main portion of control function included in an electronic control device 150 of another embodiment of the present invention. The electronic control device 150 controls the hybrid vehicle drive device 130 of FIG. 11 and corresponds to the control device for a vehicle in the present invention. In FIG. 17, an electric motor cooling facilitating means 152 is different from the electric motor cooling facilitating means 140 of the fourth embodiment in the following point. After all the hydraulic friction engagement devices (clutches C1 to C3 and brakes B1 and B2) of the automatic transmission 132 are released to interrupt the power transmission path between the second motor generator MG2 and the front and rear wheels 20 and 22 (wheels), the electric motor cooling facilitating means 152 rotates the second motor generator MG2 by using another electric motor, i.e., the first motor generator MG1. Therefore, when the temperature $T_{MG}$ of the second motor generator MG2 exceeds the predetermined temperature temp1 set in advance, if the off-road running mode is established or if the sub-transmission 36 is switched to the low-speed gear stage for off-road running, after all the hydraulic friction engagement devices (clutches C1 to C3 and brakes B1 and B2) of the automatic transmission 132 are released to interrupt the power transmission path between the second motor generator MG2 and the wheels, the second motor generator MG2 is rotated by the first motor generator MG1. In this case, the second motor generator MG2 is rotated in an unloaded state.

According to the electronic control device 150 as the control device for a vehicle of this embodiment, since the electric motor cooling facilitating means 152 is included and when the temperature $T_{MG}$ of the second motor generator MG2 exceeds the predetermined temperature temp1, if the off-road running mode is established or if the low-speed gear stage of the sub-transmission 36 is established, the electric motor cooling facilitating means 152 rotates the second motor generator MG2 after the power transmission path between the second motor generator MG2 and the wheels is interrupted by releasing the hydraulic friction engagement devices of the automatic transmission 132, the lubricant oil supplied from the cooling device 60 for cooling the second motor generator MG2 is supplied in a broader area, enhances the cooling effect of the second motor generator MG2 as compared to the case that the second motor generator MG2 is not rotated, thereby facilitating the reduction in temperature of the second motor generator MG2 as is the case with the fourth embodiment.

According to the electronic control device 150 of this embodiment, since the electric motor cooling facilitating means 152 rotates the second motor generator MG2 by using the first motor generator MG1 (another electric motor) after the power transmission path between the second motor generator MG2 and the front and rear wheels 20 and 22 (wheels) is interrupted, the rotation of the second motor generator MG2 in an unloaded state suppresses a heat generation amount from the second motor generator MG2 and, therefore, the reduction in temperature of the second motor generator MG2 can further be facilitated.

Sixth Embodiment

FIG. 18 is a functional block diagram for explaining a main portion of control function included in an electronic control device 160 of another embodiment of the present invention. The electronic control device 160 controls the hybrid vehicle drive device 130 of FIG. 11 and corresponds to the control device for a vehicle in the present invention. In FIG. 18, an electric motor cooling facilitating means 162 is different from the electric motor cooling facilitating means 140 of the fourth embodiment in the following point. After all the hydraulic friction engagement devices (clutches C1 to C3 and brakes B1 and B2) of the automatic transmission 132 are released to interrupt the power transmission path between the second motor generator MG2 and the front and rear wheels 20 and 22 (wheels), the electric motor cooling facilitating means 162 rotates the second motor generator MG2 by using the engine 12. Therefore, when the temperature $T_{MG}$ of the second motor generator MG2 exceeds the predetermined temperature temp1 set in advance, if the off-road running mode is established or if the sub-transmission 36 is switched to the low-speed gear stage for off-road running, after all the hydraulic friction engagement devices (clutches C1 to C3 and brakes B1 and B2) of the automatic transmission 132 are released to interrupt the power transmission path between the second motor generator MG2 and the wheels, the second motor generator MG2 is rotated by the engine 12. In this case, the second motor generator MG2 is rotated in an unloaded state.

According to the electronic control device 160 as the control device for a vehicle of this embodiment, since the electric motor cooling facilitating means 162 is included and when the temperature $T_{MG}$ of the second motor generator MG2 exceeds the predetermined temperature temp1, if the off-road running mode is established or if the low-speed gear stage of the sub-transmission 36 is established, the electric motor cooling facilitating means 162 rotates the second motor generator MG2 after the power transmission path between the second motor generator MG2 and the wheels is interrupted by releasing the hydraulic friction engagement devices of the automatic transmission 132, the lubricant oil supplied from the cooling device 60 for cooling the second motor generator MG2 is supplied in a broader area, enhances the cooling effect of the second motor generator MG2 as compared to the case that the second motor generator MG2 is not rotated, thereby facilitating the reduction in temperature of the second motor generator MG2 as is the case with the fourth embodiment.

According to the electronic control device 160 of this embodiment, since the electric motor cooling facilitating means 162 rotates the second motor generator MG2 by using the engine 12 disposed as a drive force source of the vehicle after the power transmission path between the second motor generator MG2 and the front and rear wheels 20 and 22 (wheels) is interrupted, the rotation of the second motor generator MG2 in an unloaded state suppresses a heat generation amount from the second motor generator MG2 and, therefore, the reduction in temperature of the second motor generator MG2 can further be facilitated.

Seventh Embodiment

Figure 19:
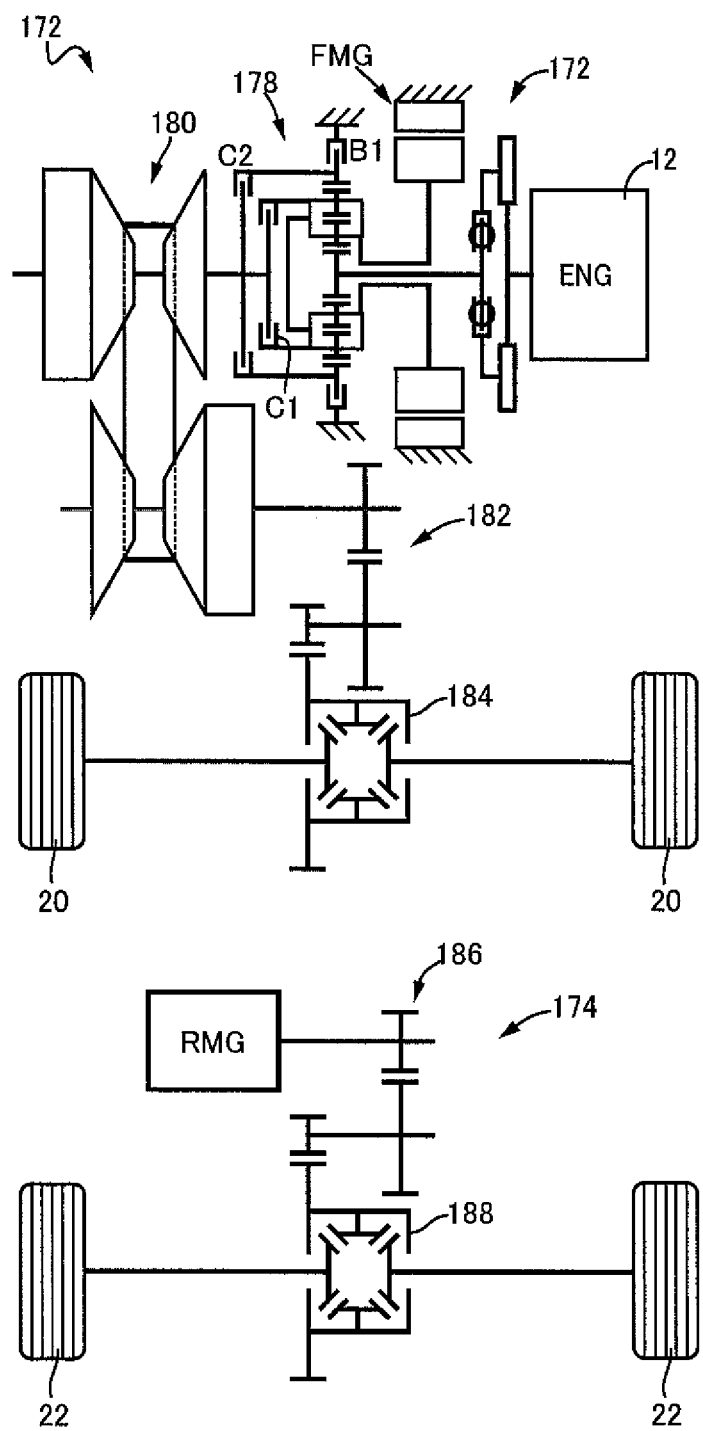
FIG. 19 is a schematic for explaining a configuration of a hybrid vehicle drive device of another embodiment of the present invention.

FIG. 19 is a schematic for explaining a configuration of a hybrid vehicle drive device 170 of another embodiment of the present invention. The hybrid vehicle drive device 170 includes a front-wheel drive device 172 driving the front wheels 20 and a rear-wheel drive device 174 driving the rear wheels 22.

The front-wheel drive device 172 includes the engine 12 as a main drive force source, a differential mechanism 178 consisting of a double pinion type planetary gear device distributing power from the engine 12 to a front motor generator FMG and an output member 176, a belt-type continuously variable transmission 180 outputting power from the output member 176 at different speeds, and a front-wheel differential gear device 184 distributing to each of a pair of the left and right front wheels 20 the power transmitted from the belt-type continuously variable transmission 180 via a reduction gear device 182. The front-wheel drive device 172 is a hybrid drive device of a type including one motor generator, i.e., the front motor generator FMG along with the engine 12. As is the case with the hybrid vehicle drive device 10 of the first embodiment, the front-wheel drive device 172 includes the cooling device 60 of FIG. 2 cooling the front motor generator FMG. The front motor generator FMG corresponds to the electric motor in the present invention.

The differential mechanism 178 includes a plurality of hydraulic friction engagement devices (clutches C1, C2, and brake B1). If the clutches C1, C2, and the brake B1 are released together, the neutral state, i.e., the neutral is established to interrupt the power transmission path between the front motor generator FMG and the output member 176. The clutches C1, C2, and the brake B1 interrupt and connect the power transmission path between the front motor generator FMG and the front wheels 20 and correspond to the clutch device in the present invention. The clutches C1, C2, and the brake B1 are actuated in response to a clutch switching operation by a driver of the vehicle and are also actuated based on an electric command from an electronic control device 190 of FIG. 20 even without the clutch switching operation.

The rear-wheel drive device 174 includes a rear motor generator RMG and a rear-wheel differential gear device 188 distributing to each of a pair of the left and right rear wheels 22 the power transmitted from the rear motor generator RMG via a reduction gear device 186.

Figure 20:
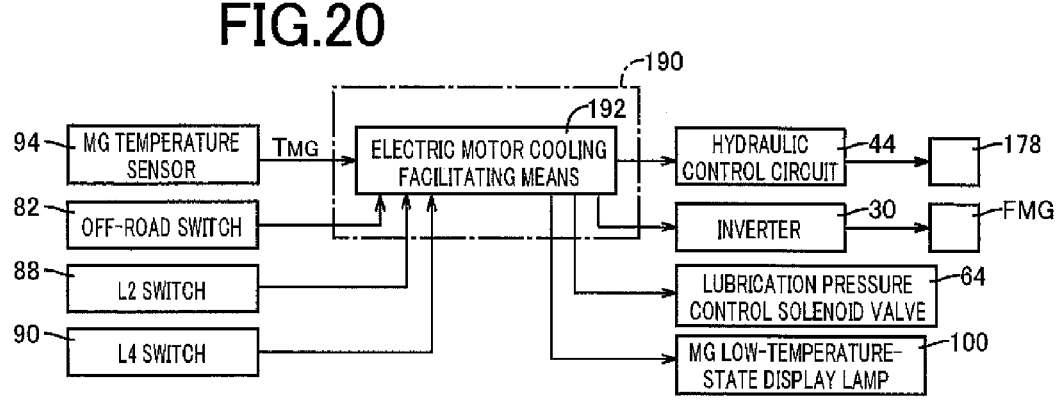
FIG. 20 is a functional block diagram for explaining a main portion of control function included in the electronic control device for controlling the hybrid vehicle drive device of FIG. 19.

FIG. 20 is a functional block diagram for explaining a main portion of control function included in the electronic control device 190 of another embodiment of the present invention. The electronic control device 190 controls the hybrid vehicle drive device 170 of FIG. 19 and corresponds to the control device for a vehicle of the present invention. In FIG. 20, an electric motor cooling facilitating means 192 is different from the electric motor cooling facilitating means 102 of the first embodiment in the following point. If the temperature $T_{MG}$ of the front motor generator FMG exceeds the predetermined temperature temp1 set in advance, the electric motor cooling facilitating means 192 releases all the hydraulic friction engagement devices (clutches C1, C2, and brake B1) of the differential mechanism 178 to interrupt the power transmission path between the front motor generator FMG and the front wheels 20 (wheels). Therefore, if the temperature $T_{MG}$ of the front motor generator FMG exceeds the predetermined temperature temp1 set in advance, after all the hydraulic friction engagement devices (clutches C1, C2, and brake B1) of the differential mechanism 178 are released to interrupt the power transmission path between the front motor generator FMG and the front wheels 20, the rotation speed $N_{MG}$ of the front motor generator FMG is increased. In this case, the front motor generator FMG is rotated by causing the front motor generator FMG to function as an electric motor. The electric motor cooling facilitating means 192 makes the rotation speed $N_{MG}$ of the front motor generator FMG higher when the temperature $T_{MG}$ of the front motor generator FMG is higher in accordance with the map depicted in FIG. 6 empirically obtained and stored in advance.

According to the electronic control device 190 as the control device for a vehicle of this embodiment, since the electric motor cooling facilitating means 192 is included and when the temperature $T_{MG}$ of the front motor generator FMG exceeds the predetermined temperature temp 1 set in advance, the electric motor cooling facilitating means 192 increases the rotation speed $N_{MG}$ of the front motor generator FMG after all the hydraulic friction engagement devices (clutches C1, C2, and brake B1) of the differential mechanism 178 are released to interrupt the power transmission path between the front motor generator FMG and the front wheels 20, the lubricant oil supplied from the cooling device 60 for cooling the front motor generator FMG is supplied in a broader area, enhances the cooling effect of the front motor generator FMG as compared to the case that the front motor generator FMG is not rotated, thereby facilitating the reduction in temperature of the front motor generator FMG as is the case with the first embodiment.

Eighth Embodiment

Figure 21:
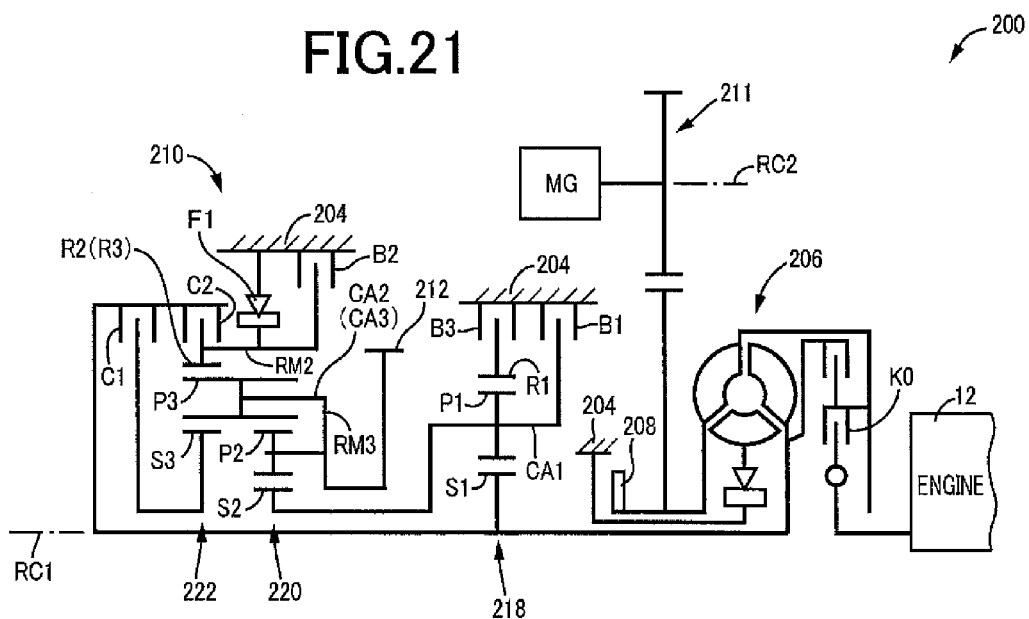
FIG. 21 is a schematic for explaining a configuration of a hybrid vehicle drive device of another embodiment of the present invention.
Figure 22:
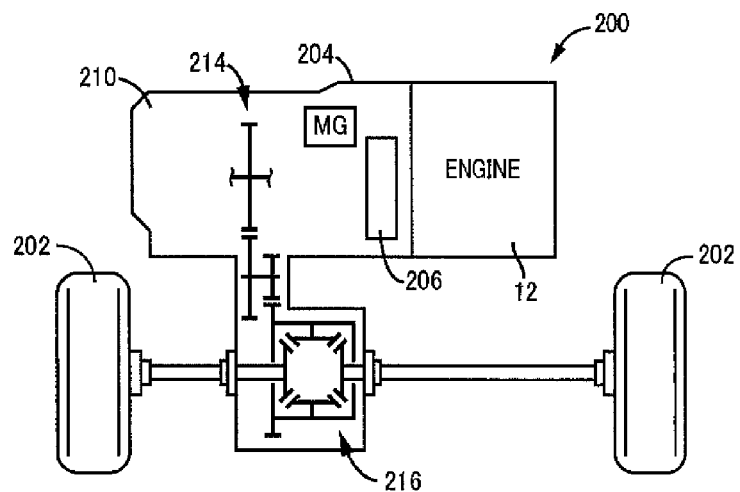
FIG. 22 is a diagram of a power transmission path from the hybrid vehicle drive device of FIG. 21 to drive wheels.

FIG. 21 is a schematic for explaining a configuration of a hybrid vehicle drive device 200 of another embodiment of the present invention. FIG. 22 is a diagram of a power transmission path from the hybrid vehicle drive device 200 to drive wheels 202.

As depicted in FIG. 21, the hybrid vehicle drive device 200 includes an engine intermittent clutch K0, a torque converter 206, and oil pump 208, and an automatic transmission 210 in this order on a first axial center RC1, i.e., in series, from the side of the engine 12 in a transaxle case 204 and includes a motor generator MG rotationally driven around a second axial center RC2 parallel to the first axial center RC1. The motor generator MG is coupled via a gear pair 211 to a pump shaft of the torque converter 206 and corresponds to the electric motor of the present invention. As depicted in FIG. 22, the hybrid vehicle drive device 200 includes in the transaxle case 204 a differential gear device 216 outputting to each of a pair of the left and right drive wheels 202 the power transmitted via a reduction gear device 214 from an output gear 212 that is an output rotating member of the automatic transmission 210. The hybrid vehicle drive device 200 includes the cooling device 60 of FIG. 2 cooling the motor generator MG as is the case with the hybrid vehicle drive device 10 of the first embodiment.

As depicted in FIG. 21, the automatic transmission 210 includes a first planetary gear device 218, a second planetary gear device 220, a third planetary gear device 222, a plurality of hydraulic friction engagement devices (clutches C1, C2, and brakes B1 to B3), and a unidirectional clutch F1. In the automatic transmission 210, each of the hydraulic friction engagement devices is engaged or released in accordance with a predetermined operation table to establish any one of gear stages of six forward speeds having respective different gear ratios and one reverse speed and the neutral at which the power transmission path between the engine 12 or the motor generator MG and the output gear 212 is interrupted. The hydraulic friction engagement devices (clutches C1, C2, and brakes B1 to B3) are those interrupting and connecting the power transmission path between the motor generator MG and the drive wheels (wheels) 202 and correspond to the clutch device of the present invention. The hydraulic friction engagement devices are actuated in response to a clutch switching operation by a driver of the vehicle and are also actuated based on an electric command from an electronic control device 224 of FIG. 23 even without the clutch switching operation.

Figure 23:
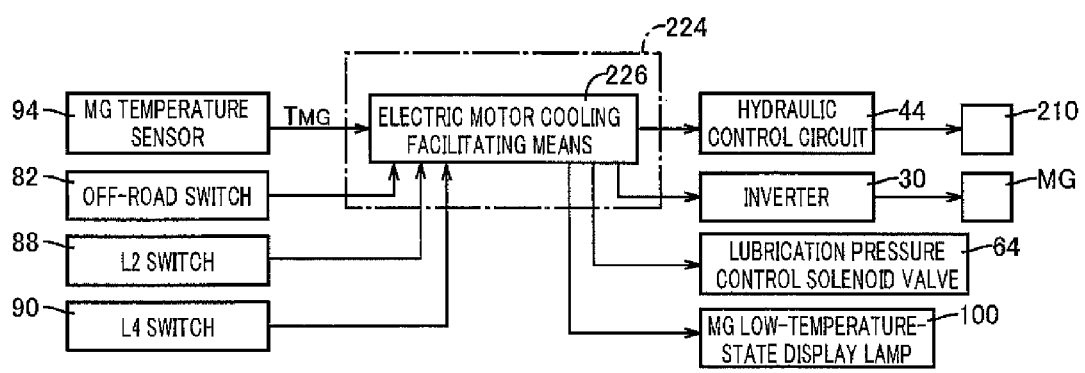
FIG. 23 is a functional block diagram for explaining a main portion of control function included in the electronic control device for controlling the hybrid vehicle drive device of FIG. 21.

FIG. 23 is a functional block diagram for explaining a main portion of control function included in the electronic control device 224 of this embodiment. The electronic control device 224 controls the hybrid vehicle drive device 200 of FIGS. 21 and 22 and corresponds to the control device for a vehicle in the present invention. In FIG. 23, an electric motor cooling facilitating means 226 is different from the electric motor cooling facilitating means 102 of the first embodiment in the following point. If the temperature $T_{MG}$ of the motor generator MG exceeds the predetermined temperature temp1 set in advance, the electric motor cooling facilitating means 226 releases all the hydraulic friction engagement devices (clutches C1, C2, and brakes B1 to B3) of the automatic transmission 210 to interrupt the power transmission path between the motor generator MG and the drive wheels (wheels) 202. Therefore, if the temperature $T_{MG}$ of the motor generator MG exceeds the predetermined temperature temp1 set in advance, after all the hydraulic friction engagement devices (clutches C1, C2, and brakes B1 to B3) of the automatic transmission 210 are released to interrupt the power transmission path between the motor generator MG and the drive wheels 202, the rotation speed $N_{MG}$ of the motor generator MG is increased. In this case, the motor generator MG is rotated by causing the motor generator MG to function as an electric motor. The electric motor cooling facilitating means 226 makes the rotation speed $N_{MG}$ of the motor generator MG higher when the temperature $T_{MG}$ of the motor generator MG is higher in accordance with the map depicted in FIG. 6 empirically obtained and stored in advance.

According to the electronic control device 224 as the control device for a vehicle of this embodiment, since the electric motor cooling facilitating means 226 is included and when the temperature $T_{MG}$ of the motor generator MG exceeds the predetermined temperature temp1 set in advance, the electric motor cooling facilitating means 226 increases the rotation speed $N_{MG}$ of the motor generator MG after all the hydraulic friction engagement devices (clutches C1, C2, and brakes B1 to B3) of the automatic transmission 210 are released to interrupt the power transmission path between the motor generator MG and the drive wheels (wheels) 202, the lubricant oil supplied from the cooling device 60 for cooling the motor generator MG is supplied in a broader area, enhances the cooling effect of the motor generator MG as compared to the case that the motor generator MG is not rotated, thereby facilitating the reduction in temperature of the motor generator MG as is the case with the first embodiment.

Although the exemplary embodiments of the present invention have been described in detail with reference to the drawings, the present invention is not limited to the embodiments and may be implemented in other forms.

For example, instead of lighting the neutral switching instruction lamp (first display device) 114 of the second embodiment, audio output prompting the neutral switching may be configured to be performed.

The predetermined temperature temp1 is not limited to around 160 degrees and may be set to another temperature.

When the temperature $T_{MG}$ of the motor generator MG2 (FMG, MG) exceeds the predetermined temperature temp1, if the off-road running mode is established or if the sub-transmission 36 is switched to the low-speed gear stage for off-road running, after the power transmission path between the motor generator MG2 (FMG, MG) and the wheels is interrupted, the motor generator MG2 (FMG, MG) is rotated; however, this is not a limitation. For example, if the temperature $T_{MG}$ of the motor generator MG2 (FMG, MG) exceeds the predetermined temperature temp1, after the power transmission path between the motor generator MG2 (FMG, MG) and the wheels is interrupted, the motor generator MG2 (FMG, MG) may be configured to be rotated.

In the electric motor cooling facilitation control, the rotation speed $N_{MG}$ of the motor generator MG2 (FMG, MG) may not be made higher when the temperature $T_{MG}$ of the motor generator MG2 (FMG, MG) is higher. For example, the rotation speed $N_{MG}$ of the motor generator MG2 (FMG, MG) may be configured to be a predetermined value set in advance.

In the fourth to sixth embodiments, the hill hold brake control may not necessarily be provided.

When the motor generator MG2 (FMG, MG) is rotated after the interruption of the power transmission path between the motor generator MG2 (FMG, MG) and the wheels in the electric motor cooling facilitation control, a lubrication oil amount supplied to the motor generator MG2 (FMG, MG) may not necessarily be increased as compared to immediately before the interruption of the power transmission path.

The configurations of the automatic transmission 26 (132, 210) and the differential mechanism 178 are not limited to those described above and may be made up of other known transmissions.

The temperature $T_{MG}$ of the motor generator MG2 (FMG, MG) may not necessarily be detected by the MG temperature sensor 94 and may be calculated based on a resistance value of the coil 58 of the motor generator MG2 (FMG, MG) from relationship empirically obtained in advance, for example.

In the electric motor cooling facilitation control, the engine 12 may be operated (rotated) or stopped.

The present invention is applicable not only to a hybrid vehicle but also to an electric vehicle.

The described embodiments are merely exemplary embodiments and, although not exemplarily illustrated one by one, the present invention may be implemented in variously modified and improved forms based on the knowledge of those skilled in the art without departing from the spirit thereof.

NOMENCLATURE OF ELEMENTS

12: engine
20: front wheels (wheels)
22: rear wheels (wheels)
50: rotor
60, 122: cooling device
68: lubrication oil supply oil passage
84, 110, 138, 150, 160, 190, 224: electronic control device (control device for a vehicle)
100: MG low-temperature-state display lamp (second display device)
114: neutral switching instruction lamp (first display device)
202: drive wheels (wheels)
B1-B3: brake (clutch device)
C1-C3: clutch (clutch device)
FMG: front motor generator (electric motor)
MG: motor generator (electric motor)
MG2: second motor generator (electric motor)
MG1: first motor generator (another electric motor)
$N_{MG}$: rotation speed (rotation speed of the electric motor)
$T_{MG}$: temperature (temperature of the electric motor)
temp1: predetermined temperature

The invention claimed is:

1. A control device for a vehicle comprising:
an electric motor disposed in a manner enabling power transmission to wheels; and
a clutch device capable of interrupting and connecting a power transmission path between the wheels and the electric motor,
wherein, if temperature of the electric motor exceeds predetermined temperature defined in advance, the electric motor is rotated in an unloaded state after the power transmission path between the wheels and the electric motor is interrupted by the clutch device.

2. The control device for a vehicle of claim 1, wherein after the power transmission path between the wheels and the electric motor is interrupted by the clutch device, the electric motor is rotated by using an engine disposed as a drive force source of a vehicle.

3. The control device for a vehicle of claim 2, comprising a cooling device having a lubrication oil supply oil passage supplying lubrication oil from inner circumferential side of the electric motor to the electric motor, the cooling device cooling the electric motor with lubrication oil supplied from the lubrication oil supply oil passage and splashed outward by a centrifugal force generated by rotation of a rotor of the electric motor.

4. The control device for a vehicle of claim 2, comprising a cooling device applying lubrication oil to the electric motor from outside of the electric motor for cooling the electric motor.

5. The control device for a vehicle of claim 1, wherein after the power transmission path between the wheels and the electric motor is interrupted by the clutch device, the electric motor is rotated by using another electric motor.

6. The control device for a vehicle of claim 5, comprising a cooling device having a lubrication oil supply oil passage supplying lubrication oil from inner circumferential side of the electric motor to the electric motor, the cooling device cooling the electric motor with lubrication oil supplied from the lubrication oil supply oil passage and splashed outward by a centrifugal force generated by rotation of a rotor of the electric motor.

7. The control device for a vehicle of claim 5, comprising a cooling device applying lubrication oil to the electric motor from outside of the electric motor for cooling the electric motor.

8. The control device for a vehicle of claim 1, comprising a cooling device having a lubrication oil supply oil passage supplying lubrication oil from inner circumferential side of the electric motor to the electric motor, the cooling device cooling the electric motor with lubrication oil supplied from the lubrication oil supply oil passage and splashed outward by a centrifugal force generated by rotation of a rotor of the electric motor.

9. The control device for a vehicle of claim 8, comprising a cooling device applying lubrication oil to the electric motor from outside of the electric motor for cooling the electric motor.

10. The control device for a vehicle of claim 1, comprising a cooling device applying lubrication oil to the electric motor from outside of the electric motor for cooling the electric motor.

11. The control device for a vehicle of claim 1, wherein when the power transmission path between the wheels and the electric motor is interrupted by the clutch device and the electric motor is rotated, an amount of the lubrication oil supplied from the cooling device to the electric motor is increased as compared to before interruption of the power transmission path.

12. The control device for a vehicle of claim 1, wherein
the clutch device is actuated based on an electric command, and wherein
if temperature of the electric motor exceeds the predetermined temperature, the power transmission path between the wheels and the electric motor is interrupted by outputting the electric command to actuate the clutch device.

13. The control device for a vehicle of claim 1, wherein
the clutch device is actuated in response to clutch switching operation by a driver of the vehicle, wherein
the control device for a vehicle comprises a first display device guiding the driver of the vehicle so that a predetermined clutch switching operation is performed for causing the clutch device to interrupt the power transmission path between the wheels and the electric motor if temperature of the electric motor exceeds the predetermined temperature.

14. The control device for a vehicle of claim 1, wherein if the power transmission path between the wheels and the electric motor is interrupted by the clutch device and the electric motor is rotated, rotation speed of the electric motor is made higher when temperature of the electric motor is higher.

15. The control device for a vehicle of claim 1, wherein when the temperature of the electric motor exceeds the predetermined temperature, if an off-road running mode is established or if a low-speed gear stage for off-road running is established, the electric motor is rotated after the power transmission path between the wheels and the electric motor is interrupted by the clutch device.

16. The control device for a vehicle of claim 1, comprising a second display device informing a driver of the vehicle that the temperature of the electric motor is equal to or less than the predetermined temperature.

* * * * *